United States Patent
Rosales et al.

(10) Patent No.: US 12,441,371 B2
(45) Date of Patent: Oct. 14, 2025

(54) DRIVER AND ENVIRONMENT MONITORING TO PREDICT HUMAN DRIVING MANEUVERS AND REDUCE HUMAN DRIVING ERRORS

(71) Applicant: Intel Corporation, Santa Clara, CA (US)

(72) Inventors: Rafael Rosales, Bavaria (DE); Ignacio J. Alvarez, Portland, OR (US); Florian Geissler, Munich (DE); Neslihan Kose Cihangir, Bavaria (DE); Michael Paulitsch, Ottobrunn (DE)

(73) Assignee: Intel Corporation, Santa Clara, CA (US)

( * ) Notice: Subject to any disclaimer, the term of this patent is extended or adjusted under 35 U.S.C. 154(b) by 926 days.

(21) Appl. No.: 17/352,560

(22) Filed: Jun. 21, 2021

(65) Prior Publication Data

US 2021/0309261 A1    Oct. 7, 2021

(51) Int. Cl.
*B60W 60/00* (2020.01)
*B60W 40/08* (2012.01)
(Continued)

(52) U.S. Cl.
CPC ........ *B60W 60/0051* (2020.02); *B60W 40/08* (2013.01); *B60W 60/001* (2020.02);
(Continued)

(58) Field of Classification Search
CPC .......... B60W 60/001; B60W 2420/40; B60W 2555/60; B60W 40/10; B60W 50/00;
(Continued)

(56) References Cited

U.S. PATENT DOCUMENTS 10,011,216 B1 *   7/2018   Rovik ................. G06V 20/597
10,308,256 B1 *   6/2019   Chan .................... B60W 40/08
(Continued)

FOREIGN PATENT DOCUMENTS

CN        111775948 A  * 10/2020  ............ B60W 40/09
WO   WO-2014111408 A1 *  7/2014  .......... B60W 40/105

OTHER PUBLICATIONS

A. Jain, A. Singh, H. S. Koppula, S. Soh, and A. Saxena,. 2016. "Recurrent Neural Networks for driver activity anticipation via sensory-fusion architecture", "Proceedings—IEEE International Conference on Robotics and Automation."
(Continued)

*Primary Examiner* — Rachid Bendidi
*Assistant Examiner* — Irene C Khuu
(74) *Attorney, Agent, or Firm* — Banner & Witcoff Ltd.

(57) ABSTRACT

Techniques are disclosed to detect, inform, and automatically correct typical awareness-related human driver mistakes. This may include those that are caused by a misunderstanding of the current situation, a lack of focus or attention, and/or overconfidence in any currently-engaged assistance features. The disclosure is directed to the prediction of vehicle maneuvers using driver and external environment modeling. The consequence of executing a predicted maneuver is categorized based upon its risk or danger posed to the driving environment, and the vehicle may execute various actions based upon the categorization of a predicted riving maneuver to mitigate or eliminate that risk.

26 Claims, 9 Drawing Sheets

(51) Int. Cl.
  *B60W 50/00* (2006.01)
  *G06V 20/56* (2022.01)
  *G06V 20/59* (2022.01)
(52) U.S. Cl.
  CPC ....... *B60W 60/0059* (2020.02); *G06V 20/597* (2022.01); *B60W 2420/40* (2013.01); *G06V 20/56* (2022.01)
(58) Field of Classification Search
  CPC ....... B60W 60/005; B60W 2050/0022; B60W 50/14; B60W 2050/146; B60W 50/0097; B60W 2040/0818; B60W 2420/403; B60W 30/0956; B60W 40/08; B60W 40/09; B60W 2520/10; B60W 2520/105; B60W 2050/0071; B60W 2050/143; B60W 2420/408; B60W 2540/18; B60W 2540/22; B60W 2540/225; B60W 2540/229; B60W 2540/26; B60W 30/095; B60W 30/18154; B60W 40/04; B60W 50/16; B60W 60/0027; B60W 10/06; B60W 10/18; B60W 10/20; B60W 2040/0827; B60W 2040/0836; B60W 2040/0872; B60W 2050/0075; B60W 2420/54; B60W 2520/06; B60W 2520/14; B60W 2540/043; B60W 2540/10; B60W 2540/21; B60W 2540/215; B60W 2540/223; B60W 2540/24; B60W 2540/30; B60W 2552/53; B60W 2554/00; B60W 2554/4029; B60W 2554/4045; B60W 2554/80; B60W 2554/802; B60W 2556/50; B60W 2556/65; B60W 2710/06; B60W 2710/18; B60W 2710/20; B60W 2720/10; B60W 30/085; B60W 30/09; B60W 30/0953; B60W 30/146; B60W 30/16; B60W 30/18145; B60W 40/00; B60W 40/02; B60W 40/105; B60W 50/0098; B60W 60/0015; B60W 60/00274; B60W 60/0051; B60W 60/0057; B60W 60/0059; G06V 20/597; G06V 20/56; G06V 10/82; G06V 20/58; G06V 10/764; G06V 20/59; G06V 40/19; G06V 40/193; G06V 10/141; G06V 10/147; G06V 10/30; G06V 10/80; G06V 20/584; G06V 20/64; G06V 20/695; G06V 2201/031; G06V 2201/06; G06V 40/103; G06V 40/20; G06V 40/23; G06V 40/25; G06N 3/08; G06N 20/00; G06N 3/045; G06N 3/084; G06N 3/006; G06N 3/04; G06N 3/063; G06N 7/01; G06N 20/10; G06N 20/20; G06N 3/044; G06N 3/047; G06N 3/049; G06N 3/088; G06N 5/01; A61B 5/4809; A61B 5/6893; A61B 5/18; A61B 5/024; A61B 2503/22; A61B 5/0077; A61B 5/01; A61B 5/0205; A61B 5/021; A61B 5/02444; A61B 5/14535; A61B 5/163; A61B 5/168; A61B 5/7275; A61B 5/746; G08B 21/06; G08B 21/02; G08B 21/0211; G08B 25/00; G08B 3/1016; G08B 31/00; G08B 5/223; G08G 1/166; G08G 1/0104; G08G 1/0175; G08G 1/16; G01S 13/867; G01S 13/62; G01S 13/865; G01S 13/88; G01S 13/931; G01S 17/87; G01S 17/931; G01S 2013/9322; G01S 2013/93271; G01S 2013/93272; G01S 2013/93274; G06F 18/214; G06F 17/00; G06F 17/18; G06F 18/217; G06F 18/24155; G06F 18/25; G06F 3/011; G06F 3/013; G06F 3/017; G06F 30/25; G06F 30/27; G06F 9/542; G06T 2207/20081; G06T 2207/20084; A61M 2021/0083; A61M 21/00; B60Q 1/076; B60Q 1/143; B60Q 2300/056; B60Q 2300/41; B60Q 2300/42; B60Q 2300/45; B60Q 9/00; B60R 21/00; B60T 2201/022; B60T 2201/024; B60T 2201/08; B60T 2201/087; B60T 7/22; B60Y 2306/13; B60Y 2400/90; B62D 1/286; B62D 15/025; B62D 6/00; G05D 1/0061; G05D 1/0088; G05D 1/0055
  See application file for complete search history.

(56) References Cited

U.S. PATENT DOCUMENTS

| | | | |
|---|---|---|---|
| 2013/0159408 A1* | 6/2013 | Winn | G06N 20/00 709/204 |
| 2015/0098609 A1* | 4/2015 | Sarratt | G06F 18/23 382/103 |
| 2017/0083821 A1* | 3/2017 | Foerster | G06N 5/022 |
| 2019/0077308 A1* | 3/2019 | Kashchenko | G06F 3/012 |
| 2020/0122734 A1* | 4/2020 | Sim | G06V 20/597 |
| 2020/0134628 A1* | 4/2020 | Jia | G06N 20/00 |
| 2020/0148213 A1* | 5/2020 | Gawande | B60W 50/0098 |
| 2020/0160064 A1* | 5/2020 | Wang | G06V 10/82 |
| 2020/0257300 A1* | 8/2020 | Matus | B64D 11/0624 |
| 2021/0107493 A1* | 4/2021 | Iwashita | B60W 30/18145 |
| 2021/0129748 A1* | 5/2021 | Tamrakar | G06F 3/167 |

OTHER PUBLICATIONS

A. Jain, H. S. Koppula, B. Raghavan, S. Soh, and A. Saxena,. 2015. ""Car that knows before you do: Anticipating maneuvers via learning temporal driving models"." Proc. of the IEEE International Conference on Computer Vision. pp. 3182-3190.

Ji, Q., Zhu, Z., & Lan, P. 2004. "Real-time nonintrusive monitoring and prediction of driver fatigue." IEEE transactions on vehicular technology, 53(4), . 1052-1068.

Kim, H., Gabbard, J. L., Martin, S., Tawari, A., & Misu, T. 2019. "Toward Prediction of Driver Awareness of Automotive Hazards: Driving-Video-Based Simulation Approach." In Proceedings of the Human Factors and Ergonomics Society Annual Meeting. vol. 63. Los Angeles: SAGE Publications. 2099-2103.

Liu, J., Xiong, H., Huang, H., Luo, Y., Zhong, Z., & Li, K. 2020. "Probabilistic Long-term Vehicle Trajectory Prediction via Driver Awareness Model . . . " IEEE Intelligent Vehicles Symposium (IV). 992-998.

Luke Petersen et al., "Situational Awareness, Driver's Trust in Automated Driving Systems and secondary task performance." SAE International Journal of Connected and Autonomous Vehicles, 2019.

Neville A. Stanton, Paul M. Salmon. 2009. "Human error taxonomies applied to driving: A generic driver error taxonomy." Safety Science 47. 227-237.

NHTSA. 2015. Crash statistics. https://crashstats.nhtsa.dot.gov/Api/Public/ViewPublication/812115.

P. Gebert et al., "End-to-end Prediction of Driver Intention using 3D Convolutional Neural Networks," IEEE Intelligent Vehicles Symposium (IV), 2019 pp. 969-974.

* cited by examiner

DRIVER AND ENVIRONMENT MONITORING TO PREDICT HUMAN DRIVING MANEUVERS AND REDUCE HUMAN DRIVING ERRORS

TECHNICAL FIELD

The disclosure described herein generally relates to predicting human driving maneuvers using driver and environment monitors, and applying varying levels of intervention to reduce or eliminate driving error related to such maneuvers.

BACKGROUND

For automated vehicles operating at Society of Automotive Engineers (SAE) levels L2+ to L4, a human driver still needs to be ready to take over control in situations that are outside of the Operational Design Domain (ODD) of the automated driving (AD) system. However, a driver may not have sufficient knowledge or understanding for more rarely frequented ODDs. For example, a U.S. driver may look in the wrong direction when driving in the UK, or the driver may not brake prior to an intersection with a right-before-left right of way rule. A driver may also be distracted for a brief period of time or temporarily drive with bad visibility, partially incapacitated to perform control or supervisory functions as part of the current ODD. As another example, a driver may fail to recognize an obstructed car entry or fail to turn on a turn signal indicator.

Moreover, NHTSA crash statistics from 2015 identifies that on average about 94% of all accidents are driver-related. From among those accidents, 41% can be attributed to recognition errors (e.g. driver inattention, internal and external distraction, inadequate surveillance), 33% to decision errors (driving too fast for given situation, misjudging gaps, speeds or actions of others), and 7% to non-performance (driver sleeping and not reacting). Thus, current AD systems have various drawbacks in that these human errors persist and are unaccounted for as part of the AV control system, and human error remains a primary source of vehicle accidents.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the techniques discussed herein.

In the drawings, like reference characters generally refer to the same parts throughout the different views. The drawings are not necessarily to scale, emphasis instead generally being placed upon illustrating the principles of the disclosure. In the following description, reference is made to the following drawings, in which.

The present disclosure will be described with reference to the accompanying drawings. The drawing in which an element first appears is typically indicated by the leftmost digit(s) in the corresponding reference number.

DETAILED DESCRIPTION

Figure 1:
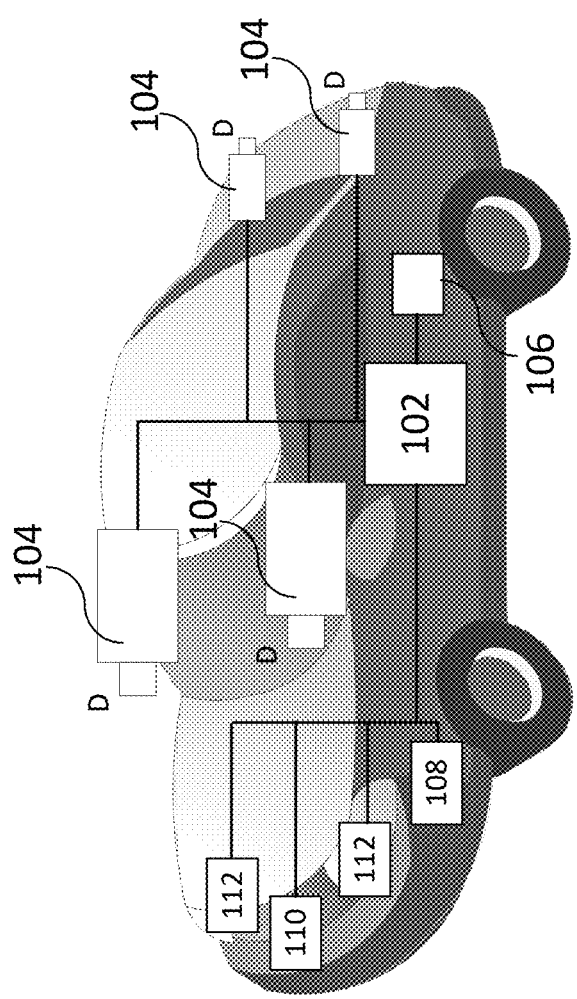
FIG. 1 illustrates a vehicle in accordance with the present disclosure.

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

The Safety Driving Model (SDM)

The SDM functions to provide a mathematical framework that aims to ensure safety assurance of autonomous vehicles (AVs) and/or any suitable type of vehicle that implements at least some form of an autonomously-executed action or control without human assistance (fully-autonomous control functions, semi-autonomous control functions, etc.). Thus, the SDM is a comprehensive framework that was developed to ensure both longitudinal and lateral safety of vehicles (such as AVs) in various types of scenarios. The SDM (also referred to as a "driving policy model" or simply as a "driving model"), may be implemented as part of a fully or semi-autonomous vehicle control system, such as an advanced driving assistance (ADAS) system and/or a driving assistance and automated driving system.

A SDM may thus be represented as any suitable number of SDM parameters, any suitable subset of which being related as part of a mathematical model formalizing an interpretation of applicable laws, standards, policies, etc., which are applicable to self-driving (such as ground) vehicles and/or other suitable types of vehicles that may implement fully autonomous or semi-autonomous functions and which may utilize tools such as the aforementioned adaptive cruise control, automated braking or steering, etc. For instance, a SDM may be designed to achieve three goals:

first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a SDM, illustratively, may be or include an implementation of a mathematical model for safety assurance that enables identification and performance of proper responses to dangerous situations such that self-perpetrated accidents can be avoided.

A SDM may implement logic that is applied to the SDM parameters to apply driving behavior rules such as the following five rules, for instance:

Do not hit someone from behind.
Do not cut-in recklessly.
Right-of-way is given, not taken.
Be careful of areas with limited visibility.
If you can avoid an accident without causing another one, you must do it.

It is to be noted that these rules are not limiting and not exclusive, and can be amended in various designs as desired. The rules rather represent a social driving contract that might be different depending on the region, and may also develop over time. While these five rules are currently applicable in most of the countries, they might not be complete and may be amended.

Although vehicles may rely on an SDM to perform various driving functions, there are issues in the implementation of the SDM for safety assurance of human driving behavior, as such systems rely on the estimation of appropriate SDM parameter values, such as reaction time. For instance, rule-based safety layers such as SDM provide a validation mechanism to identify dangerous situations based on a formal model of the road physics and traffic rules by assuming a set of maximum/minimum parameters such as acceleration. However, the predictive power of SDM is limited to a model based on velocity and acceleration of road agents in which higher-order changes are not considered. Furthermore, the efficacy of the SDM approach strongly depends on the assumed parameters.

Driver monitor systems (DMS) have also been proposed to estimate if a driver is paying attention to the road and consequently adapt the SDM parameters related to the driver reaction time by helping to estimate the reaction time of distracted drivers. However, detecting a mistake of a human driver through DMS+SDM monitoring whose attention is focused on the road may be overly optimistic, as the human driver's attention on the road may be focused on the wrong external events and potentially violate the estimated SDM parameters. Furthermore, the estimation of SDM parameters based on DMS is not suited to provide an estimate of driver reaction time for cases in which the driver is attentive to the road but not to the important events on the road. This is due to the ignorance of DMS about the external situation.

Furthermore, conventional maneuver prediction/anticipation techniques also allow for the application of a rule-based assurance approach at an earlier time to enhance the system safety through preemptive actions that avoid unescapable situations. Other conventional techniques for maneuver prediction include comparing the performance/use of simulation versus real-world events to collect a dataset of gaze-tracking based awareness, hazards ground-truth, and vehicle control performance. Other maneuver prediction approaches have been proposed that first analyze the internal driver facing camera or the road camera individually and then combine the information coming from each camera. However, maneuver prediction alone is not sufficient to identify a driver attention mistake.

Therefore, to address these shortcomings, the disclosure describes a safety system, which may be implemented in accordance with an AD system, an ADAS system, and/or other suitable vehicle control systems. The safety system may be used to detect, inform, and automatically correct typical awareness-related human driver mistakes such as those that are caused by a misunderstanding of the current situation, a lack of focus or attention, and/or overconfidence in any currently-engaged assistance features.

The disclosure as described herein is not limited to an implementation within autonomous or semi-autonomous vehicles, such as those incorporating AV and/or ADAS systems. The disclosure as described herein may be implemented as part of any suitable type of vehicle that may be capable of providing alerts to a driver and/or executing any of the control-based functionalities as discussed herein. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various implementations and/or depending upon the particular application. The disclosure further describes the implementation of active control under a shared-control mechanism to aid a vehicle operator to regain the right level of capacity to perform the driving task.

Vehicle and Accompanying Safety System

FIG. 1 shows a vehicle 100 including a safety system 200 (see also FIG. 2) in accordance with the present disclosure. The vehicle 100 and the safety system 200 are illustrative in nature and may be simplified for explanatory purposes. Locations of elements and relational distances (as discussed above, the Figures are not to scale) and are provided as non-limiting instances. The safety system 200 may include various components depending on the requirements of a particular implementation and/or application. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation (level 0) or full automation (level 5). The vehicle 100 may implement the safety system 200 as part of any suitable type of autonomous or driving assistance control system, including an AV and/or advanced driver-assistance system (ADAS), for instance.

The one or more processors 102 may be integrated with or separate from an engine control unit (ECU) of the vehicle 100. The safety system 200 may generate data to control or assist in the control of the ECU and/or other components of the vehicle 100 to directly or indirectly control the driving and/or state of the vehicle 100. However, the disclosure is not limited to an implementation within autonomous or semi-autonomous vehicles, and the safety system 200 may be implemented as part of any suitable type of vehicle that may be capable of travelling with or without any suitable level of human assistance in a particular driving environment. Therefore, one or more of the various vehicle components such as those discussed herein with reference to FIG. 2 may be implemented as part of a standard vehicle (i.e. a vehicle not using autonomous driving functions), a fully autonomous vehicle (SAE level 5), and/or a semi-autonomous vehicle (such as SAE levels L2+ to L4). When implemented as part of a standard vehicle, it is understood that the safety system 200 may perform alternate functions, and thus the safety system 200 may alternatively represent any suitable type of system that may be implemented as part of a standard vehicle without necessarily utilizing autonomous or semi-autonomous control related functions.

Figure 2:
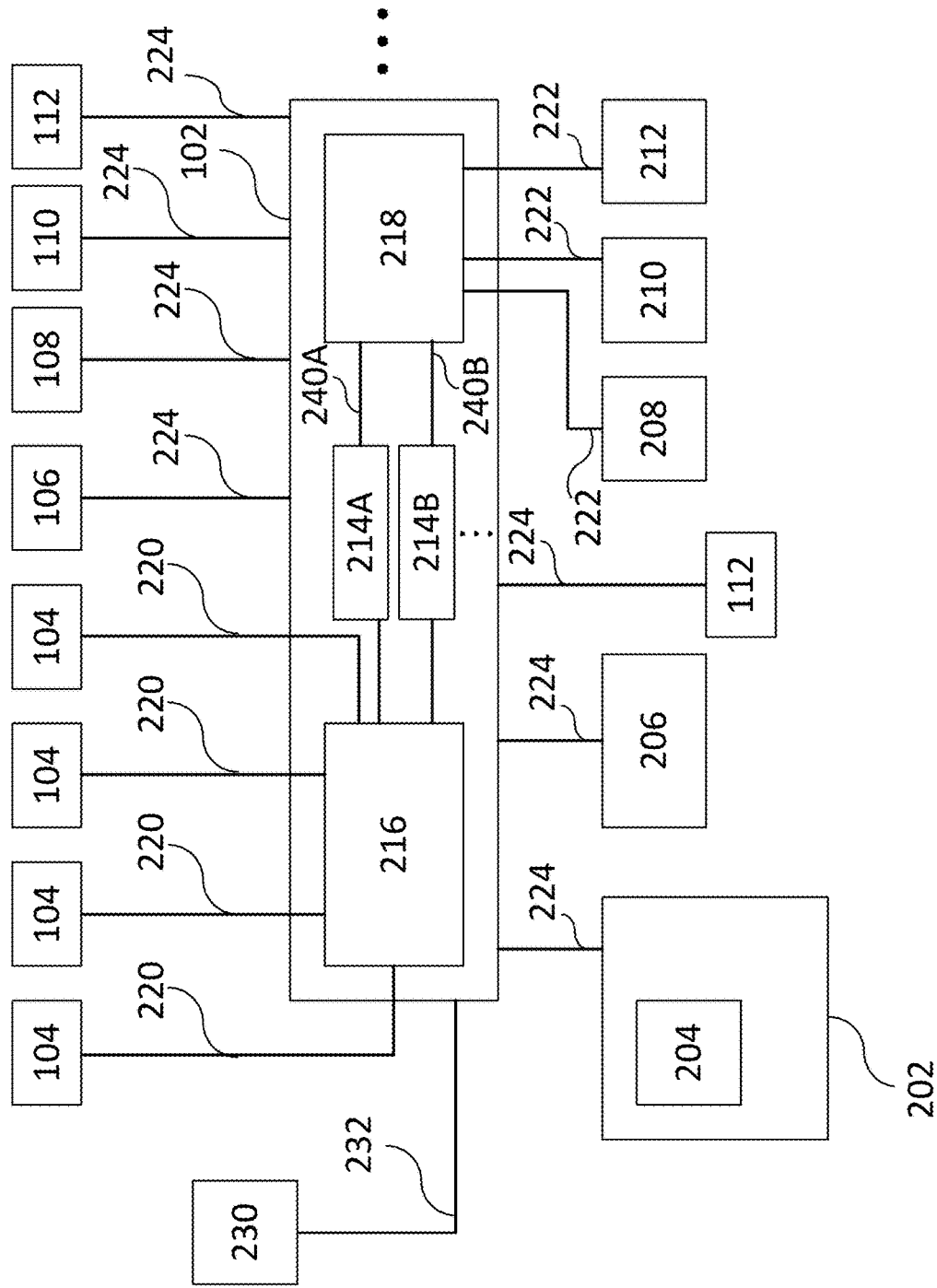
FIG. 2 illustrates various electronic components of a safety system of a vehicle in accordance with the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as one or more cameras, one or more position sensors 106 such as a Global Navigation Satellite System (GNSS), a Global Positioning System (GPS), one or more memories 202, one or more map databases 204, one or more user interfaces 206 (such as a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. A wireless transceiver (a first wireless transceiver 208) may be configured in accordance with a Short Range mobile radio communication standard such as Bluetooth, Zigbee, and the like. A wireless transceiver (a second wireless transceiver 210) may be configured in accordance with a Medium or Wide Range mobile radio communication standard such as a 3G (Universal Mobile Telecommunications System—UMTS), a 4G (Long Term Evolution—LTE), or a 5G mobile radio communication standard in accordance with corresponding 3GPP (3rd Generation Partnership Project) standards, the most recent version at the time of this writing being the 3GPP Release 16 (2020).

A wireless transceiver (a third wireless transceiver 212) may be configured in accordance with a Wireless Local Area Network communication protocol or standard such as in accordance with IEEE 802.11 Working Group Standards, the most recent version at the time of this writing being IEEE Std 802.11™-2020, published Feb. 26, 2021 (such as 802.11, 802.11a, 802.11b, 802.11g, 802.11n, 802.11p, 802.11-12, 802.11ac, 802.11ad, 802.11ah, 802.11ax, 802.11ay, and the like). The one or more wireless transceivers 208, 210, 212 may be configured to transmit signals via an antenna system (not shown) using an air interface. One or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

The one or more processors 102 may implement any suitable type of processing circuitry and architecture, and may be configured as a controller implemented by the vehicle 100 to perform various vehicle control functions, which may form part of one or more ECUs. The one or more processors 102 may be configured to function as a controller for the vehicle 100 to analyze sensor data and received communications, to calculate specific actions for the vehicle 100 to execute, and to cause the corresponding action to be executed, which may be in accordance with an AV or ADAS system. As shown in FIG. 2, the one or more processors 102 may form part of or the entirety of one or more ECUs, controllers, processing systems, etc. The vehicle 100 may implement additional ECUs, controllers, processing systems, etc., which may be dedicated to providing different types of processing analyses and/or control-based functionality. That is, the one or more processors 102 as shown in FIG. 2 may form part of any suitable number of ECUs. Alternatively, the vehicle 100 may implement additional sets of the one or more processors 102, each set being implemented in accordance with a separate ECU. The functionality of such ECUs and the various components of the one or more processors 102 are discussed in further detail herein.

The one or more processors 102 may include one or more application processors 214A, 214B, an image processor 216, a communication processor 218, and additionally or alternatively may include any other suitable processing device not shown in the Figures. Similarly, image acquisition devices 104 may include any suitable number of image acquisition devices and components depending on the requirements of a particular application. Image acquisition devices 104 may include one or more image capture devices (such as cameras, charge coupling devices (CCDs), or any other type of image sensor). The safety system 200 may also include a data interface communicatively connecting the one or more processors 102 to the one or more image acquisition devices 104. The image acquisition devices 104 may include both interior-facing cameras to capture and/or monitor the driver as well as exterior-facing cameras configured to capture images of the exterior environment in which the vehicle 100 operates. A first data interface may include any suitable wired and/or wireless first links 220 for transmitting image data acquired by the one or more image acquisition devices 104 to the one or more processors 102, such as to the image processor 216.

The wireless transceivers 208, 210, 212 may be coupled to the one or more processors 102, such as to the communication processor 218 via a second data interface. The second data interface may include any suitable wired and/or wireless second links 222 for transmitting radio transmitted data acquired by wireless transceivers 208, 210, 212 to the one or more processors 102, such as to the communication processor 218. Such transmissions may also include communications (one-way or two-way) between the vehicle 100 and one or more other (target) vehicles in an environment of the vehicle 100 (such as to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, via a third data interface. The third data interface may include any suitable wired and/or wireless third links 224. Furthermore, the position sensor 106 may be coupled to each of the one or more processors 102, via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102, form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

The one or more processors 102 may form a controller that is configured to perform various control-related functions of the vehicle 100 as discussed further herein, such as the calculation and execution of a specific vehicle velocity, acceleration, braking, steering, trajectory, etc. As another example, the vehicle 100 may in addition to or as an alternative to the one or more processors 102 implement other processors (not shown) that may form a different type of controller that is configured to perform additional or alternative types of control-related functions. Each controller may be responsible for controlling specific subsystems and/or controls associated with the vehicle 100. Each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller.

The application processors 214A, 214B may individually represent respective controllers that work in conjunction with the one or more processors 102 to perform specific controller-related tasks. The application processor 214A may be implemented as a first type controller, whereas the application processor 214B may be implemented as a different type of controller that is configured to perform other types of tasks. The one or more processors 102 may receive data from respectively-coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218.

The one or more processors 102 may additionally be implemented to communicate with any other suitable components of the vehicle 100 to determine a state of the vehicle while driving or at any other suitable time. For instance, the vehicle 100 may include one or more vehicle computers, sensors, ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol such as CAN bus communications or other suitable in-vehicle communication standards. Using the data received via the data interface 232, the one or more processors 102 may determine any suitable type of vehicle status information such as the current drive gear, current engine speed, acceleration capabilities of the vehicle 100, braking inputs indicative of the brakes being applied, throttle inputs indicative of the gas or power being applied, steering inputs, etc.

In any event, the one or more processors may include any suitable number of other processors 214A, 214B, 216, 218, each of which may comprise a sub-processor and/or include a microprocessor, pre-processors (such as an image pre-processor), graphics processors, a central processing unit (CPU), support circuits, digital signal processors, integrated circuits, memory, or any other types of devices suitable for running applications and for data processing (image processing, audio processing, etc.) and analysis and/or to enable vehicle control to be functionally realized. Each processor 214A, 214B, 216, 218 may include any suitable type of single or multi-core processor, mobile device microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective 214A, 214B, 216, 218 or accessed via another memory that is part of the safety system 200 or external to the safety system 200. This memory may include the one or more memories 202. Regardless of the particular type and location of memory accessed by the 214A, 214B, 216, 218, the memory may store software and/or executable instructions that, when executed by a relevant processor (e.g., by the one or more processors 102, one or more of the processors 214A, 214B, 216, 218, etc.), controls the operation of the safety system 200 and otherwise functions to perform the various processing tasks as discussed herein, which may include the prediction of certain maneuvers based upon driver and/or environment monitoring, the determination of a consequent of a predicted vehicle maneuver being performed, the identification of specific control functions, and the execution of such control functions. A relevant memory accessed by the one or more processors 214A, 214B, 216, 218 (e.g. the one or more memories 202) may also store one or more databases and image processing software, as well as a trained system such as a neural network or a deep neural network, which may be utilized to perform the various processing related tasks as discussed in further detail below. A relevant memory accessed by the one or more processors 214A, 214B, 216, 218 (e.g. the one or more memories 202) may be implemented as any suitable number and/or type of non-transitory computer-readable medium such as random access memories, read only memories, flash memories, disk drives, optical storage, tape storage, removable storage, or any other suitable types of storage.

The components associated with the safety system 200 as shown in FIG. 2 are illustrated for ease of explanation and not limitation. The safety system 200 may include additional, fewer, or alternate components as shown and discussed herein with reference to FIG. 2. Moreover, one or more components of the safety system 200 may be integrated or otherwise combined into processing circuitry components or separated from those shown in FIG. 2 to form distinct and separate components. For instance, one or more of the components of the safety system 200 may be integrated with one another on a common die or chip. The one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions.

The safety system 200 may further include components such as a speed sensor 108 (such as a speedometer) for measuring a speed of the vehicle 100. The safety system may also include one or more accelerometers (either single axis or multiaxis) (not shown) for measuring accelerations of the vehicle 100 along one or more axes. The safety system 200 may further include additional sensors or different sensor types such as an ultrasonic sensor, a thermal sensor, one or more radar sensors 110, one or more LIDAR sensors 112 (which may be integrated in the head lamps of the vehicle 100), digital compasses, and the like. The radar sensors 110 and/or the LIDAR sensors 112 may be configured to provide pre-processed sensor data, such as radar target lists or LIDAR target lists. The third data interface (one or more links 224) may couple the speed sensor 108, the one or more radar sensors 110, and the one or more LIDAR sensors 112 to at least one of the one or more processors 102.

The relevant memory accessed by the one or more processors 214A, 214B, 216, 218 (e.g. the one or more memories 202) may store data in a database or in any different format that indicates a location of known landmarks, which may include the location of known traffic safety mirrors and/or other features that are readily identifiable in the navigated environment in which the vehicle 100 travels. The one or more processors 102 may process sensory information (such as images, radar signals, depth information from LIDAR or stereo processing of two or more images) of the environment of the vehicle 100 together with position information, such as GPS coordinates, a vehicle's ego-motion, etc., to determine a current location and/or orientation of the vehicle 100 relative to the known landmarks and refine the determination of the vehicle's location. Certain implementations of this technology may be included in a localization technology such as a mapping and routing model.

The map database 204 may include any suitable type of database storing (digital) map data for the vehicle 100, for the safety system 200. The map database 204 may include data relating to the position, in a reference coordinate system, of various items, including roads, water features, geographic features, businesses, points of interest, restaurants, gas stations, etc. The map database 204 may store not only the locations of such items, but also descriptors relating to those items, including names associated with any of the stored features. A processor of the one or more processors 102 may download information from the map database 204 over a wired or wireless data connection to a communication network (such as over a cellular network and/or the Internet, etc.). In some cases, the map database 204 may store a sparse data model including polynomial representations of certain road features (such as lane markings) or target trajectories for the vehicle 100. The map database 204 may also include stored representations of various recognized landmarks that may be provided to determine or update a known position of the vehicle 100 with respect to a target trajectory. The landmark representations may include data fields such as landmark type, landmark location, among other potential identifiers. The map database 204 can also include non-semantic features including point clouds of certain objects or features in the environment, and feature point and descriptors.

Furthermore, the safety system 200 may implement the aforementioned SDM as part of any suitable type of control system, which may include the use of any suitable type of controller and which may form part of an advanced driving assistance system (ADAS) or a driving assistance and automated driving system. The safety system 200 may include a computer implementation of a formal model such as the SDM. As described above, the vehicle 100 may include the safety system 200 as also described with reference to FIG. 2.

General Operation of the Vehicle 100 and the Safety System 200

A vehicle is provided. With reference to FIGS. 1 and 2, the vehicle may include monitoring circuitry configured to (i) predict a vehicle maneuver based upon an analysis of driver state data and vehicle state data, and (ii) categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle. The vehicle may also include a controller configured to cause the vehicle to perform a corrective action corresponding to which one of the plurality of risk-based categories that the consequence resulting from the execution of the predicted vehicle maneuver is categorized. Furthermore, the plurality of risk-based categories may include a high-risk category associated with the predicted vehicle maneuver matching one of a set of predetermined vehicle maneuvers when executed, a mid-risk category associated with an occurrence of atypical driver behavior associated with the predicted vehicle maneuver being executed, and a low-risk category associated with an occurrence of a violation of a non-safety critical traffic rule associated with the predicted vehicle maneuver being executed. In addition or in alternative to and in any combination with the optional features previously explained in this paragraph, the plurality of risk-based categories may include a high-risk category associated with the predicted vehicle maneuver matching one of a set of predetermined vehicle maneuvers when executed, and the controller may be configured to, when the consequence resulting from the execution of the predicted vehicle maneuver is categorized in the high-risk category, cause the vehicle to perform the corrective action corresponding to an intervening vehicle control operation to prevent the execution of the predicted vehicle maneuver. In addition or in alternative to and in any combination with the optional features previously explained in this paragraph, the controller may be configured to cause the vehicle to perform the intervening vehicle control operation to provide a shared control of the vehicle between the driver and autonomous vehicle controls. In addition or in alternative to and in any combination with the optional features previously explained in this paragraph, the controller may be configured to cause the vehicle to perform the intervening vehicle control operation to provide the shared control of the vehicle by generating a weighted function that includes a first weighting applied to user vehicle control inputs, and a second weighting applied to autonomous vehicle control inputs. In addition or in alternative to and in any combination with the optional features previously explained in this paragraph, the controller may be configured to cause the vehicle to maintain the intervening vehicle control operation to provide the shared control of the vehicle until an input is received indicating that the driver is capable of controlling the vehicle. In addition or in alternative to and in any combination with the optional features previously explained in this paragraph, the controller may be further configured to cause the vehicle to maintain the intervening vehicle control operation to provide the shared control of the vehicle until the driver state data indicates that the driver has regained focus. In addition or in alternative to and in any combination with the optional features previously explained in this paragraph, the plurality of risk-based categories may include a mid-risk category associated with atypical driver behavior, the atypical driver behavior being associated with the predicted vehicle maneuver being executed, and the controller may configured to, when the consequence resulting from the execution of the predicted vehicle maneuver is categorized as the mid-risk category, cause the vehicle to perform the corrective action corresponding to the generation of a notification to the driver about the atypical driver behavior. In addition or in alternative to and in any combination with the optional features previously explained in this paragraph, the monitoring circuitry may be configured to predict an additional vehicle maneuver based upon the analysis of the driver state data after the notification is generated, and to categorize a consequence resulting from an execution of the additional predicted vehicle maneuver into one of the plurality of risk-based categories. In addition or in alternative to and in any combination with the optional features previously explained in this paragraph, the plurality of risk-based categories may include a low-risk category associated with an occurrence of a violation of a non-safety critical traffic rule associated with the predicted vehicle maneuver being executed, and the controller may be configured to, when the consequence resulting from the execution of the predicted vehicle maneuver is categorized as the low-risk category, cause the vehicle to autonomously activate a vehicle component to correct for the occurrence of the violation of the non-safety critical traffic rule.

A controller of a vehicle is provided. With reference to FIGS. 1 and 2, the controller may include a data interface configured to provide driver state data and vehicle state data; and one or more processors configured to: predict a vehicle maneuver based upon an analysis of the driver state data and the vehicle state data; categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and cause the vehicle to perform a corrective action corresponding to which one of the plurality of risk-based categories that the consequence resulting from the execution of the predicted vehicle maneuver is categorized. Furthermore, the plurality of risk-based categories includes a high-risk category associated with the predicted vehicle maneuver matching one of a set of predetermined vehicle maneuvers when executed, a mid-risk category associated with an occurrence of atypical driver behavior associated with the predicted vehicle maneuver being executed, and a low-risk category associated with an occurrence of a violation of a non-safety critical traffic rule associated with the predicted vehicle maneuver being executed. In addition or in alternative to and in any combination with the optional features previously explained in this paragraph, the plurality of risk-based categories may include a high-risk category associated with the predicted vehicle maneuver matching one of a set of predetermined vehicle maneuvers when executed, and wherein the one or more processors may be configured to, when the consequence resulting from the execution of the predicted vehicle maneuver is categorized in the high-risk category, cause the vehicle to perform the corrective action corresponding to an intervening vehicle control operation to prevent the execution of the predicted vehicle maneuver. In addition or in alternative to and in any combination with the optional features previously explained in this paragraph, the one or more processors may be configured to cause the vehicle to perform the intervening vehicle control operation to provide a shared control of the vehicle between the driver and autonomous vehicle controls. In addition or in alternative to and in any combination with the optional features previously explained in this paragraph, the one or more processors may be configured to cause the vehicle to perform the intervening vehicle control operation to provide the shared control of the vehicle by generating a weighted function that includes a first weighting applied to user vehicle control inputs, and a second weighting applied to autonomous vehicle control inputs. In addition or in alternative to and in any combination with the optional features previously explained in this paragraph, the one or more processors may be configured to cause the vehicle to maintain the intervening vehicle control operation to provide the shared control of the vehicle until an input is received indicating that the driver is capable of controlling the vehicle. In addition or in alternative to and in any combination with the optional features previously explained in this paragraph, the one or more processors may be further configured to cause the vehicle to maintain the intervening vehicle control operation to provide the shared control of the vehicle until the driver state data indicates that the driver has regained focus. In addition or in alternative to and in any combination with the optional features previously explained in this paragraph, the plurality of risk-based categories may include a mid-risk category associated with an occurrence of atypical driver behavior associated with the predicted vehicle maneuver being executed, and the one or more processors may be configured to, when the consequence resulting from the execution of the predicted vehicle maneuver is categorized as the mid-risk category, cause the vehicle to perform the corrective action corresponding to the generation of a notification to the driver about the atypical driver behavior. In addition or in alternative to and in any combination with the optional features previously explained in this paragraph, the one or more processors may be configured to predict an additional vehicle maneuver based upon the analysis of the driver state data after the notification is generated, and to categorize a consequence resulting from an execution of the additional predicted vehicle maneuver into one of the plurality of risk-based categories. In addition or in alternative to and in any combination with the optional features previously explained in this paragraph, the plurality of risk-based categories may include a low-risk category associated with an occurrence of a violation of a non-safety critical traffic rule associated with the predicted vehicle maneuver being executed, and the one or more processors may be configured to, when the consequence resulting from the execution of the predicted vehicle maneuver is categorized as the low-risk category, cause the vehicle to autonomously activate a vehicle component to correct for the occurrence of the violation of the non-safety critical traffic rule.

A non-transitory computer-readable medium of a vehicle is provided. With reference to FIGS. 1 and 2, the non-transitory computer-readable medium may have instructions stored thereon that, when executed by one or more processors of the vehicle, cause the vehicle to: predict a vehicle maneuver based upon an analysis of driver state data associated with a driver of the vehicle and vehicle state data; categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and cause the vehicle to perform a corrective action corresponding to which one of the plurality of risk-based categories that the consequence resulting from the execution of the predicted vehicle maneuver is categorized. Furthermore, the plurality of risk-based categories include a high risk category associated resulting from the predicted vehicle maneuver matching one of a set of predetermined dangerous vehicle maneuvers when executed, a mid-risk category associated with an occurrence of atypical driver behavior when the predicted vehicle maneuver will be executed, and a low-risk category associated with an occurrence of a violation of a non-safety critical traffic rule when the predicted vehicle maneuver will be executed. In addition or in alternative to and in any combination with the optional features previously explained in this paragraph, the plurality of risk-based categories may include a high risk category associated resulting from the predicted vehicle maneuver matching one of a set of predetermined dangerous vehicle maneuvers when executed, and wherein the instructions, when executed by one or more processors of the vehicle, cause the vehicle to, when the consequence resulting from the execution of the predicted vehicle maneuver is categorized as the high-risk category, perform the corrective action corresponding to an intervening vehicle control-based operation to prevent the execution of the predicted vehicle maneuver. In addition or in alternative to and in any combination with the optional features previously explained in this paragraph, the plurality of risk-based categories may include a mid-risk category associated with an occurrence of atypical driver behavior when the predicted vehicle maneuver will be executed, the plurality of risk-based categories may include a low-risk category associated with an occurrence of a violation of a non-safety critical traffic rule when the predicted driving maneuver will be executed, and the instructions, when executed by one or more processors of the vehicle, may cause the vehicle to: when the consequence resulting from the execution of the predicted vehicle maneuver is categorized as the mid-risk category, perform the corrective action corresponding to the generation of a notification to the driver about the atypical driver behavior; and when the consequence resulting from the execution of the predicted vehicle maneuver is categorized as the low-risk category, cause the vehicle to autonomously activate a vehicle component to correct for the occurrence of the violation of the non-safety critical traffic rule.

Scenarios of Driver Actions

Figure 3B:
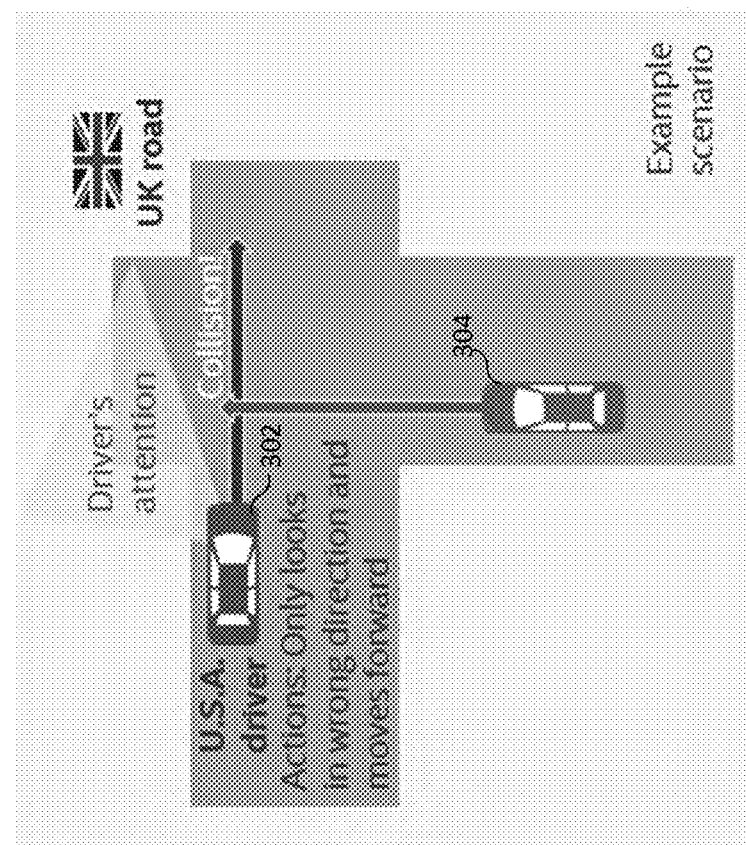
FIG. 3B illustrates another scenario of driver actions that violate traffic rules due to awareness-related misjudgment of a vehicle, in accordance with the present disclosure.
Figure 3A:
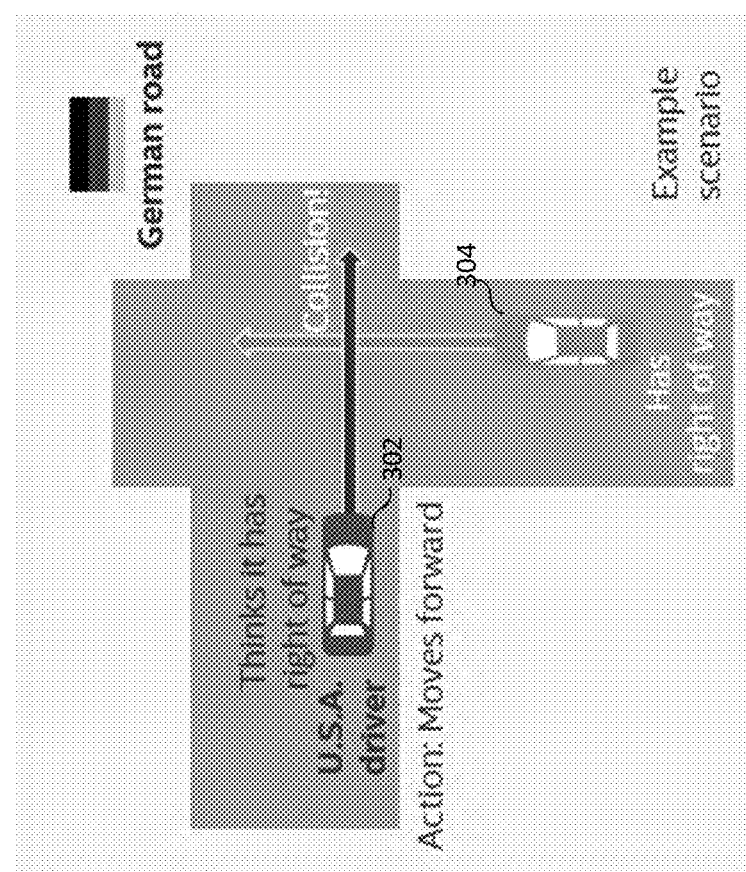
FIG. 3A illustrates one scenario of driver actions that violate traffic rules due to awareness-related misjudgment of a vehicle, in accordance with the present disclosure.

FIG. 3A illustrates one scenario of driver actions that violate traffic rules due to awareness-related misjudgment of a vehicle, in accordance with the present disclosure. In the intersection as shown in FIG. 3A, a non-local driver is shown in the vehicle 302, who is assumed to be unfamiliar with the right-of-way rule in another jurisdiction. The vehicle 304 has the right-of-way in this scenario. The driver of the vehicle 302 may incorrectly believe he has the right of way and proceed through the intersection and potentially cause a collision. This dangerous scenario could be prevented by a timely identification of the driver's action to continue forward at the intersection in a right-first zone. This could include a determination, based upon an analysis of the interior-facing camera images, that the driver of the vehicle 302 is focusing his attention forward instead of looking to the right for the approaching vehicle 304.

FIG. 3B illustrates another scenario of driver actions that violate traffic rules due to awareness-related misjudgment of a vehicle, in accordance with the present disclosure. In the intersection as shown in FIG. 3B, a non-local driver is shown in the vehicle 302, who is assumed to be unfamiliar with the right-of-way rule in another jurisdiction. In this jurisdiction, the vehicles travel on the left side of the road versus the right side in which the driver of the vehicle 302 is familiar. The attention of the driver of the vehicle 302 in this scenario is directed to the left instead of the right, as would be common in the driver of the vehicle 302's home jurisdiction. Thus, the scenario shown in FIG. 3B illustrates that the driver of the vehicle 302 mistakenly looks in the wrong direction, observes no vehicles approaching the intersection, and then continues to move forward into the intersection potentially causing a collision with the vehicle 304.

The disclosure as discussed in further detail herein is directed to addressing such scenarios as well as any other suitable scenario in which a particular driving maneuver or driver action may be predicted by monitoring the attention/focus of the driver and/or environment. As further discussed herein, a mechanism is disclosed to identify human driver mistakes due to situational unawareness before a dangerous situation is reached, to determine the best course of action to mitigate the potential consequences of such mistakes, and initiate that action considering progressive sharing of control and responsibility between the driver and the vehicle's control systems.

Process Flow for Driver and Environment Monitoring System

Figure 4:
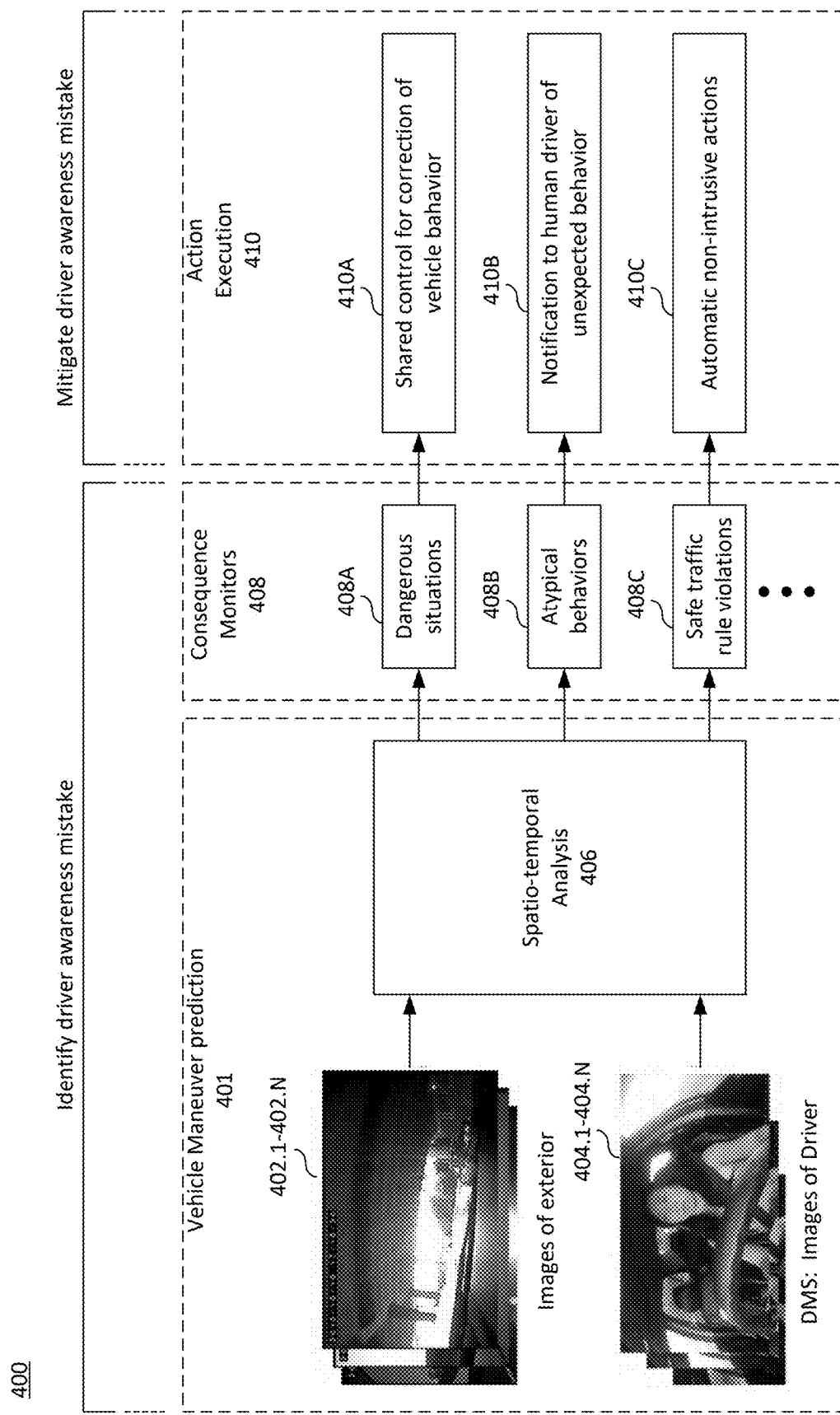
FIG. 4 illustrates processing operations for identifying and mitigating driver awareness mistakes, in accordance with the present disclosure.

FIG. 4 illustrates processing operations for identifying and mitigating driver awareness mistakes, in accordance with the present disclosure. The process flow 400 as shown in FIG. 4 illustrates an overall process flow shown in two general stages, the first of which being the identification of a particular type of driver awareness mistake, which is followed by the second stage that includes accompanying mitigation or correction of that mistake. For the first stage, the identification of the awareness-related human driver mistake may implement an analysis of both in-vehicle driver monitor system (DMS) and/or interior-facing cameras or other sensors and exterior-facing cameras, external environment monitoring systems, and/or external sensors. The data derived from each of these systems are jointly analyzed to first predict the immediate vehicle maneuver, which is then used to evaluate the potential consequences and potential risk mitigation actions.

The DMS, interior-facing cameras or other sensors may be implemented as any suitable type of a vehicle safety system that is configured to assess the driver's alertness and typically execute some type of intervening action such as alerting the driver or applying the brakes if needed. The DMS may be implemented as part of the safety system 200 in accordance with any suitable techniques or architecture, including those of a known design, although the particular actions ordinarily executed via the DMS may instead be executed as discussed in further detail herein based upon the particular type of maneuver that is identified. In other words, an existing vehicle DMS may be leveraged to acquire the data used for driver monitoring, such as the images 404.1-404.-N or, alternatively, the DMS may be identified with one or more components of the safety system 200 used to acquire the relevant driver awareness data such as images of the driver 404.1-404.N. Thus, the DMS may be implemented via any suitable combination of the vehicle 100's onboard sensors (image acquisition devices 104, which may be internally-facing cameras), the one or more processors 102, and/or one or more of the application processors 214A, 214B, image processor 216, communication processor 218, etc. Likewise, the data acquired for environmental monitoring purposes may be implemented using existing vehicle monitors (such as the vehicle's exterior-facing cameras) and/or via any suitable combination of the vehicle 100's onboard sensors, the one or more processors 102 and/or one or more of the application processors 214A, 214B, image processor 216, communication processor 218, etc.

The data shown in FIG. 4 includes a set of N number of images 402.1-402.N corresponding to the exterior of the vehicle as well as a set of N number of images 404.1-404.N corresponding to the interior of the vehicle. The images 402, 404 shown in FIG. 4 are non-limiting, and may generally represent data acquired via any suitable number and/or type of the vehicle 100's onboard sensors (image acquisition devices 104, position sensors 106, speed sensors 108, radar sensors 110, LIDAR sensors 112, etc.). This may include camera images from interior and exterior-facing cameras, but is not limited to this particular implementation, as the images 402, 404 may additionally or alternatively represent other types of sensor data or image data from which a driver monitoring and environment monitoring may be performed, which may include radar data, LIDAR data, ultrasonic data, etc. Thus, although the analysis as discussed herein is described in terms of image analysis, this is for ease of explanation and not intended to be a lamination. The analyses as discussed herein to predict vehicle maneuvers and the consequence of vehicle maneuvers being performed may be performed directly on raw data or on processed data if available. This may include the result of an environment model and the resulting output may be in 3D or 2D and contains road geometry, dynamic and static road actors/ traffic controllers, etc.

As shown in FIG. 4, the vehicle maneuver prediction processing block 401 may receive the images 402, 404 via any suitable data interface, such as one or more of the first, second, and third data interfaces as discussed herein with reference to the safety system 200, which are configured to provide the images 402.1-402.N and 404.1-404.N. The images 402.1-402.N and 404.1-404.N are then fed to a spatio-temporal analysis processing block 406, which performs maneuver prediction as discussed in further detail herein. The vehicle maneuver prediction processing block 401 and/or the spatio-temporal analysis processing block 406 may represent an analysis performed by any suitable type of trained system such as a three-dimensional convolutional neural network (3D CN). The vehicle maneuver prediction processing block 401 and/or the spatio-temporal processing block 406 may thus be implemented by and/or represent the processing performed via any of the processors 102, 214A, 214B, 216, 218 working independently and/or in combination with one another, as noted above, and which may execute program instructions stored in a suitable memory (e.g. a local memory and/or a memory of the one or more memories 202).

Regardless of the particular implementation, the spatio-temporal processing block 406 functions to perform maneuver prediction to achieve a robust anticipation of vehicle maneuvers, which may be repeated as new external and internal monitoring data is received to continuously predict any suitable number of vehicle maneuvers, which may alternatively be referred to herein as human driving maneuvers or driving maneuvers. The spatio-temporal processing block 406 thus generates, as one or more outputs, vehicle maneuver information that is then used by the consequence monitors processing block 408 to evaluate the different categories of consequences for executing each predicted vehicle maneuver. The maneuver information may represent a specific maneuver predicted by the trained system using the environmental and driver monitoring data as shown in FIG. 4, which may include the use of camera images 402, 404 from the inside and the outside of the vehicle. The predicted vehicle maneuvers may include a prediction of a specific vehicle action in accordance with a defined likelihood or probability as provided by the trained system implemented by the spatio-temporal processing block 406, such as the vehicle is turning left, turning right, moving straight ahead, shifting lanes, etc. One illustrative scenario might include the prediction of the vehicle 100 turning left based upon an analysis that the driver is looking to the left from the interior-facing camera images 404.1-404.N while the exterior-facing camera images 402.1-402.N indicate that the vehicle 100 is at an intersection for which a left hand turn is possible.

The consequence or potential level of danger of the predicted vehicle maneuver is then determined by the consequence monitoring processing block 408 in the context of the position of the vehicle within the environment, other objects or vehicles that may be present, the state of the vehicle, the time at which the maneuver is predicted to occur, etc. The consequence monitoring processing block 408 may include any suitable number of independent monitor processing blocks 408A, 408B, 408C, etc., each functioning to detect a specific classification or category of a consequence resulting from the occurrence of a predicted vehicle maneuver. Each of these monitors may be implemented in accordance with any suitable type of processing system, trained system, algorithm, etc., based upon the complexity of the consequence that is being detected. This may include any suitable type of trained system such as a neural network like the aforementioned 3D CNN or other suitable neural network, the use of a lookup table correlating atypical behaviors to specific types of consequences, image processing and/or machine vision algorithms, etc. In any event, the consequence monitoring processing block 408 may be implemented by and/or represent the processing performed via any of the processors 102, 214A, 214B, 216, 218 working independently and/or in combination with one another, as noted above, and which may execute program instructions stored in a suitable memory (e.g. a local memory and/or a memory of the one or more memories 202). The consequence monitor processing blocks 408A, 408B, 408C, etc., may share the architecture of processing components or have dedicated processing components configured to perform their respective functions.

The different consequences may represent classifications of varying degrees of danger or risk, each having one or more corresponding linked action(s) to mitigate or prevent the driver awareness mistake based upon the particular type of driving maneuver and the state of the environment in which the vehicle 100 is navigating when the vehicle maneuver is predicted. The consequence monitoring processing block 408 may identify any suitable number of various classifications of consequences resulting from the predicted vehicle maneuver, with three being shown in FIG. 4 as a non-limiting illustration. As shown in FIG. 4, these classifications include, in the order of most to least dangerous, potentially dangerous situations that must be corrected, the detection of atypical behaviors that may trigger a warning or instruction to the driver, and non-safety critical traffic rule violations that can be controlled automatically by the vehicle safety system 200 transparently and without further intrusion.

Although the various consequence monitoring processing blocks 408A, 408B, 408C may function to independently classify or categorize predicted vehicle maneuvers based upon the level of danger each poses to the driver or other vehicles in the environment, the consequence monitoring processing block 408 may perform such classifications using data obtained from the other consequence monitors. That is, the consequence monitoring processing blocks 408A, 408B, 408C, etc. may classify a corresponding predicted vehicle maneuver as a particular consequence only when the predicted vehicle maneuver has not already been classified as posing a higher risk by another consequence monitor 408A, 408B, 408C, etc. This may include the consequence monitoring processing block 408B classifying a predicted vehicle maneuver as an atypical behavior only when the consequence monitoring processing block 408A fails to classify the predicted vehicle maneuver as a dangerous situation requiring control-based intervention, the consequence monitoring processing block 408C classifying a predicted vehicle maneuver as a traffic rule violation only when the consequence monitoring processing block 408B fails to classify the predicted vehicle maneuver as an atypical behavior, etc. Alternatively, each of the consequence monitor 408A, 408B, 408C, etc. may independently classify the predicted vehicle maneuver irrespective of the classification by the other consequence monitors, such that a particular vehicle maneuver may be classified into more than one type of consequence category.

Again, the predicted vehicle maneuvers output from the spatio-temporal processing block 406 are evaluated through a set of consequence monitors at processing block 408 and assigned to one of several different consequence categories, which may match the aforementioned classifications as shown in FIG. 4 and noted above. The action execution processing block 410 may include any suitable number of control processing blocks 410A, 410B, 410C, etc., each corresponding to one of the consequences categorized by a respective one of the consequence monitories 408A, 408B, 408C, etc. In any event, the action execution processing block 410 may be implemented by and/or represent the processing performed via any of the processors 102, 214A, 214B, 216, 218 working independently and/or in combination with one another, as noted above, and which may execute program instructions stored in a suitable memory (e.g. a local memory and/or a memory of the one or more memories 202).

As shown in FIG. 4, the first (and highest risk, referred to herein as high-risk) consequence category may include potentially dangerous situations that require assistance or control-based intervention by the vehicle safety system 200. The corresponding risk mitigation actions, which are identified and/or executed via the action execution processing block 410A, include the activation of a shared control approach to assist the driver with a minimum amount of corrective action to avoid a dangerous situation. The second consequence category (and lower risk, referred to herein as mid-risk) includes atypical behaviors that deviate from history-based expectations. When such categorized consequences are detected, the action execution processing block 410B may perform an appropriate action such as notifying the driver of a potential situation unawareness using visual/auditory signals. The third consequence category (and lowest risk, referred to herein as low-risk) includes predicted vehicle maneuvers that violate mandatory traffic rule conformance, which may be addressed by applying an automatic action to transparently correct the predicted maneuver without intrusive control of the vehicle. This may include the action execution processing block 410C activating automatic signaling to such as a turn signal.

Driver and Environment Monitoring System

Figure 5:
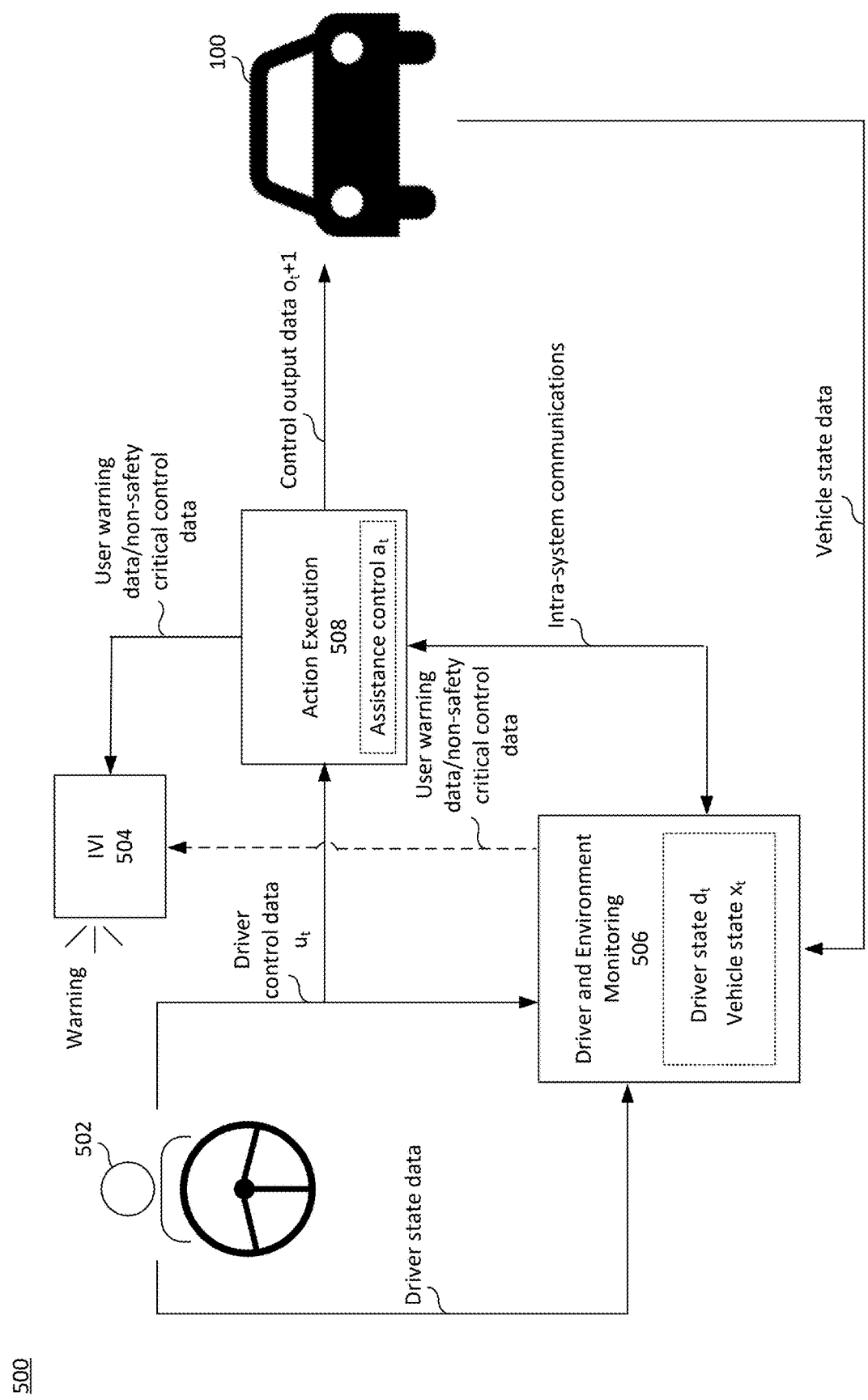
FIG. 5 illustrates a driver and environment monitoring system, in accordance with the present disclosure.

FIG. 5 illustrates a driver and environment monitoring system, in accordance with the present disclosure. The system 500 includes a vehicle 100, a driver 502, and various components that may be integrated with or otherwise associated with the vehicle 100. The system 500 also includes an in-vehicle infotainment (IVI) system 504, which is a non-limiting illustration and may be implemented as any suitable type of audio and/or visual system configured to present notifications, information, and/or warnings to the driver 502, additional details of which are further discussed herein. The system 500 may be identified with or otherwise implement the safety system 200 as shown and discussed above with reference to FIG. 2 and/or implement specific components of the safety system 200 or other suitable processing components to perform the functionality as discussed herein.

Thus, one or more of the various components of the system 500 may be alternatively referred to herein as a controller of the vehicle 100, although it is understood that the system 500 may also include additional controllers as discussed herein that may form part of the safety system 200. The various arrows and/or interconnections between the components as shown in FIG. 5 may represent any suitable number and/or type of communication links, which may include wired and/or wired data links, buses, etc., and which may support communication between the various components of the system 500, the safety system 200, and/or the vehicle 500 in accordance with any suitable type and/or number of communication protocols.

In the non-limiting illustration shown in FIG. 5, the vehicle maneuvering prediction, consequence categorization, and corrective action as discussed above with reference to FIG. 4 and elsewhere herein may generally be divided into functions performed by the driver and environment monitoring processing block 506 and the action execution processing block 508. The driver and environment monitoring processing block 506 may be identified with the maneuver prediction processing block 401 and the consequence monitoring processing block 408 as discussed herein with reference to FIG. 4, and be alternatively referred to herein as monitoring circuitry. The action execution processing block 508 may be identified with the action execution processing block 410 as discussed herein with reference to FIG. 4. Thus, the driver and environment monitoring processing block 506 and the action execution processing block 508 may be implemented as separate and independent systems, sub-systems, controllers, ECUs, processing circuitry, etc. that may be identified with the various components of the safety system 200 and/or the vehicle 100 as discussed herein. Alternatively, the driver and environment monitoring processing block 506 and the action execution processing block 508 may be implemented as partially or fully shared systems, sub-systems, controllers, ECUs, processing circuitry, etc. that may be identified with the various components of the safety system 200 and/or the vehicle 100 as discussed herein. In one scenario, the driver and environment monitoring processing block 506 may be implemented as a first ECU or controller configured to perform functions related to the prediction of vehicle maneuvers and the classification or categorization of the consequence of such vehicle maneuvers being executed by the vehicle. Continuing this scenario, the action execution processing block 508 may be implemented as a second ECU or controller and be configured to perform specific actions based upon the classification of the consequence of a predicted vehicle maneuver being executed to mitigate or prevent risks resulting from such vehicle maneuvers prior to or during their occurrence.

The environment monitoring processing block 506 is configured to monitor both the state of the driver 502 and the state of the vehicle 100 to determine the likelihood of the driver 502 being unable to operate the vehicle 100 safely. The state of the driver 502 may be determined and/or monitored by the driver and environment monitoring processing block 506 via the use of any suitable in-vehicle sensors, such as cameras directed towards the interior of the vehicle, biometric sensors, eye tracking sensors, etc., which may form part of an existing DMS, the safety system 200, or separate components. The driver state data as shown in FIG. 5 may include the images 404.1-404.N as discussed above with reference to FIG. 4, and additionally or alternatively include any other suitable sensor data indicative of the driver's attention and/or state in the vehicle 100.

The state and/or driving environment of the vehicle 100 may be determined and/or monitored using any suitable external sensors, such as cameras, LIDAR, RADAR, ultrasound, etc. and/or vehicle sensors indicative of a current operating condition or status of the vehicle 100. This may include data from internal vehicle components such as engine speed, acceleration data, speed data, heading data, position data, etc. The vehicle state data may thus encompass any suitable type of data indicative of the status of the vehicle 100 and/or the environment in which the vehicle 100 is operating. The vehicle state data may be generated via integrated components of the safety system 200 or separate components. Thus, the vehicle state data as shown in FIG. 5 may include the images 402.1-402.N of the exterior of the vehicle 100 as discussed above with reference to FIG. 4, and additionally or alternatively include any other suitable sensor data indicative of the state of the vehicle 100 and/or the environment of the vehicle 100. The driver control data $u_t$, may represent the state of any suitable number of driving control variables related to the control of the vehicle 100 and may include various driver inputs such as braking control, throttle control, steering control, etc.

As discussed in further detail below, the driver and environment monitoring block 506 is configured to predict vehicle maneuvers based upon the driver and vehicle state using the driver state data and the vehicle state data. The driver and environment monitoring block 506 may categorize the consequence of the occurrence of the predicted vehicle maneuvers and communicate this information to the action execution processing block 508 as part of the intra-system communications as shown in FIG. 5. The action execution processing block 508 may then generate user warning data, non-safety critical control data, and/or vehicle assistance control data (which may be considered safety critical control data) based upon the particular category of the consequence of the predicted vehicle maneuver actually occurring. The user warning data and/or the non-safety critical control data may be transmitted to the IVI 504, which may decode the user warning data to present the appropriate warning to the driver 502, such as an audible or visual warning, text, etc. Additionally or alternatively, the IVI 504 may decode non-safety critical control data to perform automatic non-intrusive actions such as activating a blinker. The vehicle assistance control data may be generated to facilitate shared control of the vehicle 100 between the driver 502 and the autonomous control systems implemented by the safety system 200, which is discussed in further detail herein.

The separation of the driver and environment monitoring processing block 506 and the action execution processing block 508 as shown in FIG. 5 is for ease of explanation and to provide a separation of functional logic. However, the driver and environment monitoring processing block 506 and the action execution processing block 508 may be implemented by the safety system 200 as part of a commonly-executed control application, algorithm, program, etc. Therefore, the intra-system communications between the driver and environment monitoring processing block 506 and the action execution processing block 508 enables the driver and environment monitoring processing block 506 and the action execution processing block 508 to identify, communicate, and arbitrate which functions are to be performed by each of the processing block components. That is, the particular functions performed by the driver and environment monitoring processing block 506 and/or the action execution processing block 508 with respect to the generation of the user warning data, the non-safety critical control data, and/or the assistance control data may vary depending upon the particular implementation of the system 500 in the vehicle 100.

Thus, the driver and environment monitoring block 506 may additionally or alternatively generate the user warning data, the non-safety critical control data, and/or the vehicle assistance control data. The user warning data and/or the non-safety critical control data may be transmitted from the driver and environment monitoring processing block 506 to the IVI 504 in addition to or instead of the action execution processing block 508 doing so. Moreover, the user warning data, the non-safety critical control data, and/or the vehicle assistance control data may alternatively or additionally be communicated from the driver and environment monitoring processing block 506 to the action execution processing block 508 via the intra-system communications. Thus, the driver and environment monitoring processing block 506 and/or the action execution processing block 508 may determine the appropriate action based upon the categorized consequence of a predicted vehicle maneuver occurring, which may include the aforementioned user warnings and/or a suitable type of vehicle control operation. The vehicle control operation may be executed via the transmission of the control output data from the action execution processing block 508 to the relevant control systems of the vehicle 100.

With this in mind, the various processing operations to predict vehicle maneuvers, categorize the consequence of the vehicle maneuver occurring, and executing the appropriate action in response to the consequence categorization are discussed in further detail below.

Vehicle Maneuver Prediction

Figure 6:
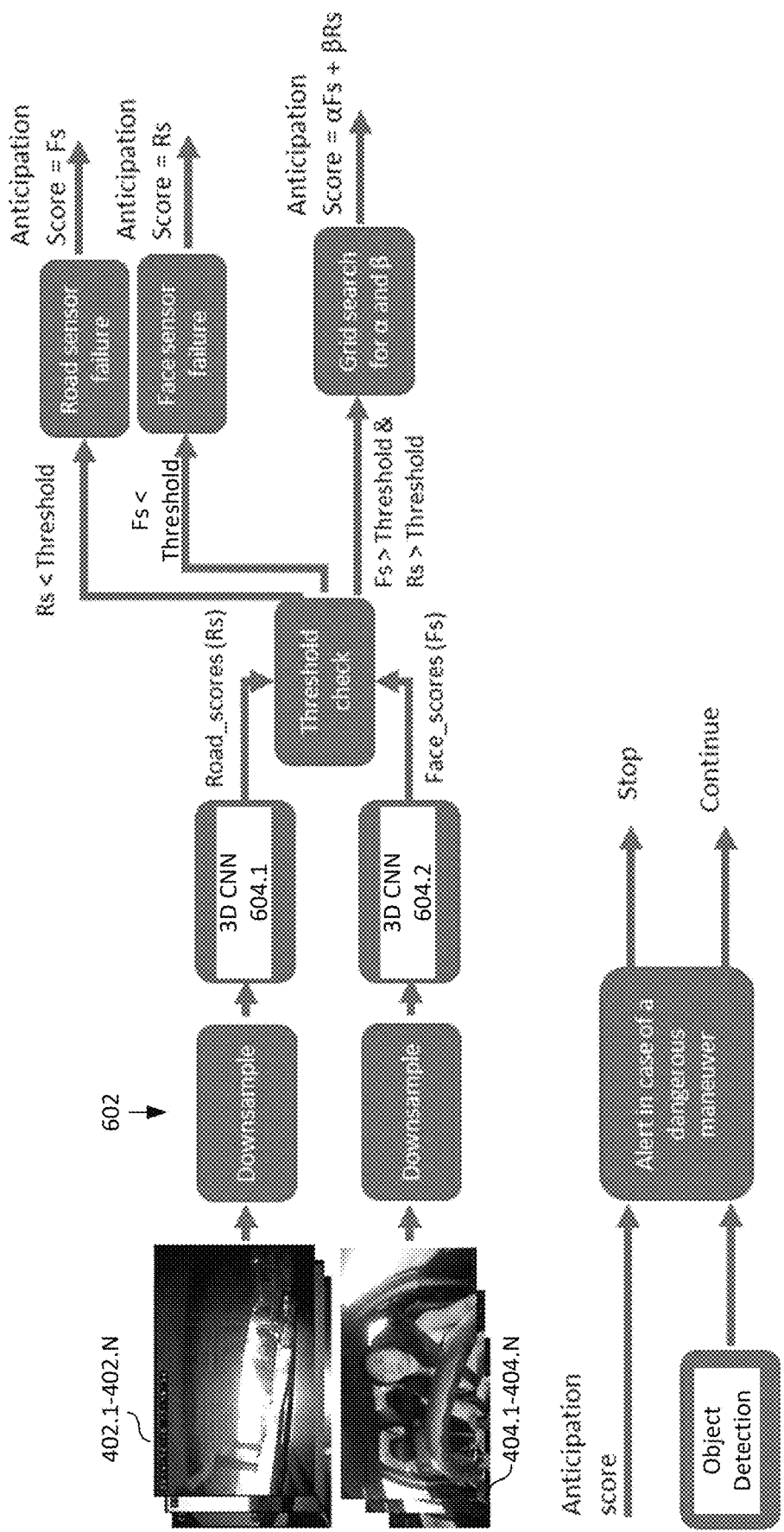
FIG. 6 illustrates the use of 3D CNNs to perform vehicle maneuver prediction, in accordance with the present disclosure.

Again, complementary information from driver facing cameras and road facing cameras, such as the images 402.1-402.N, 404.1-404.N as shown in FIG. 4, may be implemented to predict and classify types of ego-vehicle maneuvers. The spatio-temporal analysis architecture 600 as shown in FIG. 6 may be identified with the spatio-temporal analysis processing block 406 as shown and discussed above with reference to FIG. 4, which may also be identified with the driver and environment monitoring processing block 506 as shown in FIG. 5. The spatio-temporal analysis architecture 600 may thus function to predict a vehicle maneuver based upon an analysis of images of a driver of the vehicle and images external to the vehicle, and may utilize the recordings of at least two cameras to do so, which are mounted to record the driver's face and the road simultaneously. The recordings may include any suitable length of video samples such as 6 seconds, 8 seconds, 10 seconds, etc., which show images prior to the occurrence of the predicted vehicle maneuver. The recordings, which include the images 402.1-402.N and 404.1-404.N, may alternatively be referred to herein as a data, video, or image stream, or simply as a stream.

As shown in FIG. 6, a spatio-temporal analysis to predict vehicle maneuvers may be implemented via a 3D-CNN architecture that utilizes an open source 3D CNN solution known as 3D ResNet50, although this is a non-limiting illustration and any suitable type of machine learning and/or neural network may be implemented for this purpose. The spatio-temporal analysis architecture 600 implements two independent 3D CNNs: 3D CNN 604.1 to analyze the images 402.1-402.N of the exterior of the vehicle and 3D CNN 604.2 to analyze the images 404.1-404.N of the driver. The downsampling stage 602 performs downsampling of the video from each source, which is recorded over a particular time period such as 6 seconds, to obtain a smaller number of frames or video samples that are compatible with the particular 3D CNNs 604.1, 604.2. For the 3D ResNet50 architecture, the downsampling stage 602 may provide a number of video samples of the images 402.1-402.N and the images 404.1-404.N such as 2, 8, 16, etc.

Each 3D CNN 604.1, 604.2 may be trained in accordance with any suitable type of training data depending upon the particular type of images that it is expected to analyze to perform vehicle maneuver prediction. Thus, the 3D CNNs 604.1, 604.2 may be trained in accordance with any suitable techniques, including known techniques, to output road scores Rs and face scores Fs for any suitable number and/or type of vehicle maneuvers that are being predicted.

The generated road scores Rs and the face scores Fs may respectively represent a probability of each one of several types of vehicle maneuvers being performed such as driving straight, changing to the left lane, changing to the right lane, turning left, turning, right, etc. That is, each of the 3D CNNs 604.1, 604.2 outputs a set of probability or anticipation scores for each one of a set of different types of maneuvers using an analysis of images for each respective stream. Thus, the 3D CNN 604.1 outputs a set of road scores Rs that may include types of classified vehicle maneuvers and an accompanying probability of each one being performed based upon an analysis of the exterior images 402.1-402.N. The 3D CNN 604.2 outputs a set of face scores Fs that also include types of classified vehicle maneuvers and an accompanying probability of each one being performed based upon an analysis of the driver images 404.1-404.N.

The spatio-temporal analysis architecture 600 then combines the output of each 3D CNN 604.1, 604.2 to achieve a robust prediction or anticipation of a particular vehicle maneuver from the set of vehicle maneuvers and accompanying probabilities output by each of the 3D CNNs 604.1, 604.2. In other words, because each 3D CNN 604.1, 604.2 functions to predict a vehicle maneuver but from a different image source, this may be leveraged to increase the accuracy of the vehicle maneuver prediction. This includes a threshold checking feature to account for sensor or camera malfunctions. This may include taking the maximum anticipation score from each of the road scores Rs and face scores Fs output by each 3D CNN 604.1, 604.2, and comparing each maximum anticipation score to a respective threshold value. These thresholds may be selected as any suitable values that indicate that a reasonable vehicle maneuver prediction cannot be determined based upon that 3D CNN's image source, indicating a likely sensor failure. In the event that a threshold check fails, i.e. the maximum anticipation road score Rs or maximum anticipation face score Fs value is less than a respective threshold value, then the vehicle maneuver may be predicted by selecting a vehicle maneuver type corresponding to the maximum anticipation score from the other 3D CNN output, as shown in FIG. 6.

Assuming that the maximum anticipation score from each of the road scores Rs and face scores Fs output by each 3D CNN 604.1, 604.2, respectively, are greater than their respective threshold values, then the 3D CNN based architecture 600 may predict the vehicle maneuver by applying an appropriate weighting $\alpha$ to the maximum anticipation face score Fs from the anticipation face scores, and applying an appropriate weighting $\beta$ to the maximum anticipation road score Rs from the anticipation road scores output by each respective one of the 3D CNN 604.1, 604.2. To identify the appropriate values for the weights $\alpha$, $\beta$, a grid search is applied to find the optimum weights for each stream. The corresponding final anticipation score is then computed by using the weighted sum of the maximum anticipation face score Fs and the maximum anticipation road score Rs, which corresponds to a numeric equivalent of a specific predicted vehicle maneuver, such as one of the five mentioned above, as the anticipated score combines the maximum scores indicating a predicted vehicle maneuver associated with each stream.

The grid search may be performed to provide the optimum score that is associated with the highest likelihood of a specific type of vehicle maneuver being performed in a future time period. The weights $\alpha$, $\beta$ represent any suitable value within a range of predetermined values, such as 0-1. Thus, the weights $\alpha$, $\beta$ may have a relationship such that $\alpha+\beta=1$ as represented in the anticipation score as shown in FIG. 6. The grid search may thus constitute part of the inference stage of the 3D CNNs 604.1, 604.2 with the weights $\alpha$, $\beta$ being predetermined values that are part of the offline training of the 3D CNNs 604.1, 604.2. In other words, the anticipation score may be the result of a grid search performed at the inference stage to select the weights $\alpha$, $\beta$ such that the predicted vehicle maneuver associated with the anticipation face scores Fs and anticipation road score Rs best match the training data used by the 3D CNNs 604.1, 604.2 to make the vehicle maneuver classification.

Thus, when each threshold check is passed, the anticipation score represents a vehicle maneuver having the highest likelihood of being performed based upon the weighted sum of the vehicle maneuvers classified by the 3D CNNs 604.1 and 604.2. The anticipation scores may be calculated dynamically or continuously as new images are received in the stream from the internal and external facing cameras such that the anticipation scores (Rs, Fs) are calculated at different times t, where t means t seconds before each predicted vehicle maneuver is about to occur. Moreover, and because the 3D CNNs 604.1, 604.2 each perform an analysis individually on each stream, a robust solution is achieved even in the existence of sensor failures. That is, significant accuracy may be achieved from one stream in case of a failure in the other camera, thus enabling a meaningful result to still be obtained albeit with a decreased accuracy. This solution also yields fast performance since the 3D CNN based architecture 600 is applied only one time while computing the video accuracy instead of taking the average of clip accuracies.

Again, the 3D CNNs 604.1, 604.2 may be trained in accordance with any suitable training techniques. For the training of the 3D CNNs 604.1, 604.2 as shown in FIG. 6 for the two streams, a pretrained model may be used such as the 3D ResNet50 that is pretrained on a large-scale video dataset such as Kinetics-600, which is a dataset including 600 action classes. Because these action classes might not include actions that are as fast as the ones occurring in an external sensing of an AD, the applied downsampling enables a sufficient tradeoff between accuracy and processing speed. Also, and as discussed above, the downsampling stage 602 may be applied at each stream in any suitable manner to provide the 3D CNNs 604.1, 604.2 with a suitable number of image samples for analysis, which may then be used to provide the anticipation scores used to determine the predicted vehicle maneuver at a future time t. The anticipation score may then be used in response to the detection of an object to determine whether to alert the driver or to perform an intervening share control of the vehicle, as shown in FIG. 6 and discussed in further detail herein.

Figure 7:
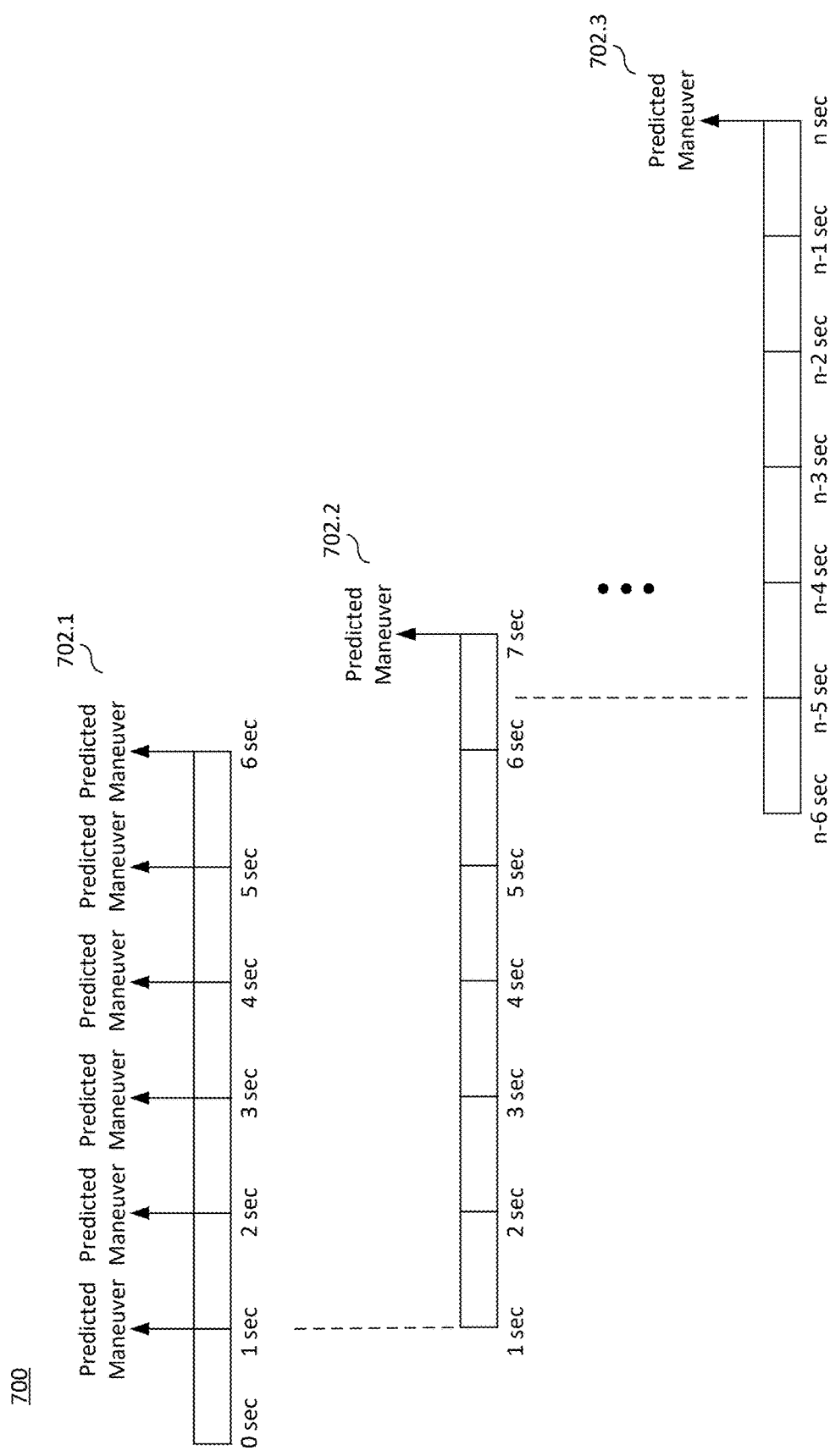
FIG. 7 illustrates a dynamic adjustment of a length of video samples used to compute anticipation scores for vehicle maneuver prediction, in accordance with the present disclosure.

The downsampling process may include the technique as shown in further detail in FIG. 7, which shows scenarios corresponding to three different time periods or sampling windows. The time periods shown in FIG. 7 illustrate that the length of video samples for each of the streams as discussed above with respect to FIG. 6, which are used to compute the anticipation scores for vehicle maneuver prediction, may be dynamically adjusted over time. That is, the spatio-temporal analysis architecture 600 may include each of the 3D CNNs 604.1, 604.2 computing an anticipation score as discussed above using a number of samples generated as part of the downsampling process from any suitable sampling window length, such as the aforementioned 6 second window noted above. However, the spatio-temporal analysis architecture 600 may repeatedly calculate and output an anticipation score in accordance with a particular anticipation score calculation frequency, which may be more frequent than the sampling window used to perform the anticipated score calculations. In the non-limiting illustration shown in FIG. 7, an anticipation score is output via each of the 3D CNNs 604.1, 604.2 each second, although the anticipation score calculation frequency may be greater or less than one second depending upon the particular application. In any event, the anticipation score output via each of the 3D CNNs 604.1, 604.2 in accordance with the anticipation score calculation frequency may be calculated using the number of downsampled video samples from a previous sampling window such as 6 seconds as shown in FIG. 7.

In this way, each of the 3D CNNs 604.1, 604.2 calculates an anticipation score using a set of downsampled video samples from the previous sampling window (such as 6 seconds) in a "rolling" fashion, i.e. doing so in accordance with the anticipation score calculation frequency (such as each second) as additional video data becomes available. Thus, at a given point in time, the 3D CNNs 604.1, 604.2 may predict vehicle maneuvers using the video samples from the most recent sampling window and repeatedly do so in accordance with the anticipation score calculation frequency as additional video samples are received in each stream. However, there may be times when video samples are not available for the full length of the sampling window, such as during initialization or startup. The first time period 702.1 is identified with such a scenario, and thus illustrates the 3D CNNs 604.1, 604.2 performing anticipation score calculations corresponding to vehicle maneuver predictions each second. Because the entirety of the 6 seconds of video samples are not available during this initial scenario, the downsampling may be performed over one second of video samples instead of the entire 6 second sampling window to obtain the required number of video samples for the 3D CNNs 604.1, 604.2 (such as 16).

However, upon the sampling window elapsing, which is 6 seconds is this illustration, the 3D CNNs 604.1, 604.2 may then perform the anticipation score calculations corresponding to vehicle maneuver predictions using the downsampled video samples from the entire previous 6 second window. The 3D CNNs 604.1, 604.2 may continue to calculate the anticipation scores and corresponding vehicle maneuvers each second, but these calculations may now be based upon the downsampled data from a larger 6-second sampling window to obtain the required number of video samples for the 3D CNNs 604.1, 604.2 (such as 16). This may be achieved by adjusting the downsampling ratio to any suitable value considering the frame rate of the cameras proving the video steam samples and the size of the video data considered for evaluation.

At the time of this writing, the most recent paper on maneuver anticipation was published by Gebert et al. IV 2019, which applies 3D Convolutional Neural Networks (CNNs) on optical flow data extracted from RGB frames. The techniques described in this disclosure, however, such as those performed via the spatio-temporal analysis architecture 600 as shown in FIG. 6, outperforms these state-of-the art results on the same dataset in particular for the road facing camera case as shown in Table 1 below.

TABLE 1

| 5-fold cross-validation Accuracy (%) at t = 0 sec | Spatio-temporal analysis architecture 600 | (P. Gebert 2019) IV 2019 |
| --- | --- | --- |
| Face Data | 83.9 ± 2.2 | 83.1 ± 2.5 |
| Road Data | 79.1 ± 4.0 | 53.2 ± 0.5 |
| Fusion (Score level) | 86.6 ± 1.9 | 75.5 ± 2.4 |

Both approaches apply a pretrained model on a Kinetics dataset. In a Kinetics dataset, the motion information in action classes is not as significant as the one occurring in a real driving scenario (i.e., maneuvers recorded via the external sensing of autonomous driving). The existing approaches apply 3D CNNs to consecutive frames, whereas the techniques disclosed herein, particularly via the spatio-temporal analysis architecture 600, apply 3D CNNs 604.1, 604.2 on downsampled data, which enables the capture of significant motion information. The techniques described herein also provide a faster solution by optionally applying ResNet once instead of computing the video accuracy from clip accuracies, and using RGB data instead of optical flow, which is computationally costly. Analysis was done with only one 3D CNN accepting 16-frame video samples as input, and downsampling was applied to cover an extensive time span.

Moreover, Table 2 shows maneuver anticipation scores at a different time t to the occurrence of actual maneuvers being performed.

TABLE 2

| 5-fold cross-validation Accuracy (%) | t = 0 sec to maneuver | t = 0.9 sec to maneuver | t = 2.2 sec to maneuver | t = 2.8 sec to maneuver | t = 4.1 sec to maneuver |
| --- | --- | --- | --- | --- | --- |
| Face Data | 83.9 ± 2.2 | 80.4 ± 3.2 | 76.1 ± 3.7 | 74.3 ± 2.9 | 65.7 ± 2.1 |
| Road Data | 79.1 ± 4.0 | 78.4 ± 3.6 | 66.8 ± 4.0 | 60.2 ± 5.4 | 52.2 ± 4.2 |
| Fusion | 86.6 ± 1.9 | 84.7 ± 2.9 | 76.7 ± 3.1 | 73.1 ± 3.9 | 65.5 ± 3.2 |

The results show that face data (DMS) always provides more information for vehicle maneuver anticipation compared to road data. The road data (environment) also has more discriminative information with respect to a vehicle maneuver's precise time of occurrence (t is small). The fusion of road and face data has a positive impact towards the vehicle maneuver's precise time of occurrence (t is small). Also, it is noted that the standard deviation is higher for road data compared to face data, and that the techniques disclosed herein, particularly via the spatio-temporal analysis architecture 600, outperform such conventional systems.

Vehicle Maneuver Consequence Monitoring

As noted above, vehicle maneuver consequence monitors may be implemented to classify the result of a particular predicted vehicle maneuver actually occurring. This section is directed to the classification or categorization of a consequence resulting from the execution of a predicted vehicle maneuver into one of a plurality of risk-based categories. As noted above with reference to FIGS. 4 and 5, each one of the plurality of risk-based categories may be in accordance with a severity or risk of danger resulting from the execution of the predicted driving maneuver in a driving environment in which the vehicle operates. The vehicle maneuver consequence monitoring as discussed herein may be performed by the consequence monitor processing block 408 and/or the independent consequence monitor processing blocks 408A, 408B, 408C, etc., each functioning to detect a specific type of classification of a consequence resulting from a predicted vehicle maneuver. The predicted vehicle maneuver may be output from the spatio-temporal analysis architecture 600 as discussed above with reference to FIG. 6 or, alternatively, via the spatio-temporal analysis processing block 406 as shown in FIG. 4.

The consequence monitoring techniques described herein implement three different kinds of monitors to identify the need to trigger three corresponding types of actions, although this is not a limitation and the disclosure may include any suitable number and/or type of consequence monitors and corresponding actions. As further discussed herein, the vehicle 100 may perform a corrective action corresponding to which one of the risk-based categories the consequence of executing the predicted maneuver is categorized. The corrective actions include shared-control activation, notification of unexpected behavior, and automated actions, which are discussed in turn below in further detail.

The first and highest risk category of consequences defined for a particular predicted vehicle maneuver includes a high-risk category associated with dangerous situations, which may be identified via the dangerous situations monitor processing block 408A as shown in FIG. 4. The dangerous situations monitor processing block 408A may categorize the consequence of performing a predicted vehicle maneuver by matching the predicted driving maneuver to one of a set of predetermined vehicle maneuvers that are known to be dangerous. This may additionally or alternatively include the identification of the consequence of performing the predicted vehicle maneuver at a specific future time based upon an analysis of SDM parameters as noted above. The dangerous situations monitor processing block 408A may be identified with the driver and environment monitoring processing block 506 as shown in FIG. 5, and thus utilize as inputs the predicted vehicle maneuver output by the spatio-temporal analysis architecture 600 and the environment data, which is received as part of the vehicle state data as noted above.

The dangerous situations monitor processing block 408A may function to apply any suitable type of SDM safety rule verification of predicted vehicle maneuvers to evaluate potential safety violation in accordance with the SDM implemented by the safety system 200. The dangerous situations monitor processing block 408A may then periodically or continuously generate a list of predicted vehicle maneuvers that, if performed, would be dangerous. This list of maneuvers may then be transmitted to the action execution processing blocks 410, 508, as shown in FIGS. 4 and 5, respectively. With reference to FIG. 5, this may be implemented via the intra-system communications between the environment monitoring processing block 506 and the action execution processing block 508. The data output by the dangerous situations processing block 408 may include the information listed in Table 3 below, and may additionally or alternatively include other suitable information for each predicted vehicle maneuver that is categorized as being dangerous if executed at a specific time.

TABLE 3

| Predicted maneuver | Estimated likelihood of maneuver | Time stamp of maneuver estimation | prediction time (in seconds to maneuver) |
| --- | --- | --- | --- |

The second category of consequences defined for a particular predicted vehicle maneuver includes a mid-risk category associated with atypical driver behavior, which may be identified via the atypical behaviors monitor processing block 408B as shown in FIG. 4. The atypical behaviors monitor processing block 408B may categorize the consequence of a predicted vehicle maneuver as falling into this category based upon the occurrence of atypical driver behavior associated with when the predicted driving maneuver is to be executed. Thus, the atypical behaviors monitor processing block 408B functions to identify when a human driver is not entirely capable of safely controlling the vehicle due to an awareness error and/or inattentiveness to important road events. The atypical behaviors monitor processing block 408B may be identified with the driver and environment monitoring processing block 506 as shown in FIG. 5, and thus utilize as inputs the predicted vehicle maneuver and the images 404.1-404.N of the driver from the interior-facing cameras as discussed above. With reference to FIG. 5, the images 404.1-404.N may be part of the driver state data that is received by the driver and environment monitoring processing block 506 as noted above.

The atypical behaviors monitor processing block 408B may categorize a predicted vehicle maneuver as being in the mid-risk category using a trained model that predicts awareness-related mistakes. This may include the atypical behaviors monitor processing block 408B being implemented using a trained system such as a neural network, 3D CNN, etc., that performs an offline training process that creates a classification model trained using the aforementioned two data streams as inputs. This includes the predicted vehicle maneuver list, which may constitute categorical data as noted above with reference to Table 3, and the driver images 404.1-404.N, which may constitute image data. The trained model may thus provide any suitable number and/or type of target labels, such as various typical human driving mistakes. The model may classify a set of common/known human driving mistakes, such as looking in the wrong direction (a direction that does not match that of the predicted vehicle maneuver at the time it is to be performed). This set of human driver mistakes, which may serve as labels for the classifier, may be identified in accordance with the non-limiting Table 4 and include additional or alternate mistakes/scenarios based upon the particular implementation and application. Additionally or alternatively, the set of human driver mistakes/scenarios may be derived from known human error taxonomy studies. It is noted that because the trained model uses the predicted vehicle maneuver as one of its inputs, which relies upon external vehicle images and/or sensors, the list of identified human driver mistakes and associated symptoms are detectable by a combination of external sensing and internal driver images, in contrast to a conventional DMS only.

TABLE 4

| Predicted maneuver/situation | DMS (images 404.1-404.N) | Likely human driver mistake |
| --- | --- | --- |
| Other object in collision path | Driver does not look at object/collision region | Recognition error e.g. due to confusion of traffic rules (e.g. left-hand side vs right-hand side traffic), distraction, poor sight of driver |
| Other object in collision path | Driver looks at object/collision region | Misjudgment of object's speed, actions or remaining gaps, confusion of traffic rules (e.g. incorrectly assumed right of way) |
| Ego-vehicle entering T-junction, roundabout etc. | Driver looking to the wrong side (i.e. not at oncoming traffic) | Confusion of traffic rules (e.g. left-hand side vs right-hand side traffic) |
| Other object in collision path | Driver is in a relaxed posture | Driver likely to non-perform, e.g. due to recognition error, confusion of traffic rules (e.g. right of way) |
| Ego-vehicle is following a slower vehicle/is on the outmost lane and other vehicles are on the neighboring lane | Driver frequently checking the rear mirror/turns head back/attempts to put the blinker | Driver likely to attempt an unsafe overtake maneuver, misjudging gaps |

Once trained, the atypical behaviors monitor processing block 408B may implement the model at runtime to obtain the atypical driving behavior or mistake. The atypical behaviors monitor processing block 408B may output a notification regarding the estimated atypical driving behavior. As noted above, each of the consequence monitors processing blocks 408A, 408B, and 408C may operate in a tiered or conditional manner based upon the categorization of the other consequence monitoring processing blocks. Thus, the atypical behaviors monitor processing block 408B may generate the notification when the dangerous situations monitor processing block 408A is not triggered, as the correction of the atypical behavior is addressed via the dangerous situations monitor processing block 408A in this case. However, and with reference to FIG. 5, the atypical behaviors monitor processing block 408B (which may be implemented as part of the driver and environment monitoring processing block 506) may generate and transmit the notification as the user warning data to the IVI 504, causing the IVI 504 to provide a suitable warning to the driver 502. Additionally or alternatively, the atypical behaviors monitor processing block 408B may transmit he notification to the action execution processing block 508, which may transmit the user warning data to the IVI 504 as part of its executed actions to cause the IVI 504 to provide a suitable warning to the driver 502, thereby mitigating the impact of the atypical behavior. An example of the data output by the atypical behaviors monitor processing block 408B is represented in the non-limiting Table 5 below. The notifications may include additional or alternate information.

TABLE 5

| Class of predicted driver mistake (e.g. from Table 4) | Estimated likelihood of driver mistake | Time stamp of mistake estimation | Mistake detection delay (estimated elapsed time from mistake occurrence to detection) |
| --- | --- | --- | --- |

The action execution processing block 508 and/or the IVI 504 may utilize the data output from the atypical behaviors monitor processing block 408B in this manner to determine the type of notification to generate and when the notification should be generated to warn the driver 502 prior to the occurrence of the mistake.

The third category of consequences defined for a particular predicted vehicle maneuver includes a low-risk category associated with safe traffic rule violations, which may be identified via the safe rule traffic violations monitor processing block 408C as shown in FIG. 4. The safe rule traffic violations monitor processing block 408C may categorize the consequence of a predicted vehicle maneuver as falling into this category based upon an identification of the occurrence of a violation of a non-safety critical traffic rule associated with the time of the predicted driving maneuver being executed.

The safe rule traffic violations monitor processing block 408C may be identified with the driver and environment monitoring processing block 506 as shown in FIG. 5, and thus utilize as inputs the predicted vehicle maneuvers, the vehicle's location, and the external images 402.1-402.N as discussed above. The vehicle 100's location may be identified using the vehicle state data, which may include the use of any suitable type of location and/or orientation data obtained via the sensors of the safety system 200. The vehicle 100's location may thus represent geographic coordinates of the vehicle, a map location of the vehicle, an orientation of the vehicle, etc. With reference to FIG. 5, the external images 402.1-402.N may also be part of the driver state data that is received by the driver and environment monitoring processing block 506 as noted above. The safe rule traffic violations monitor processing block 408C may utilize these inputs to output a list of non-safety-critical predicted violations in terms of a category and time period.

TABLE 6

| Class of predicted safe violation | Estimated likelihood of violation | Time stamp of violation estimation | Violation detection delay (estimated elapsed time from violation occurrence to detection) |
| --- | --- | --- | --- |

Figure 8:
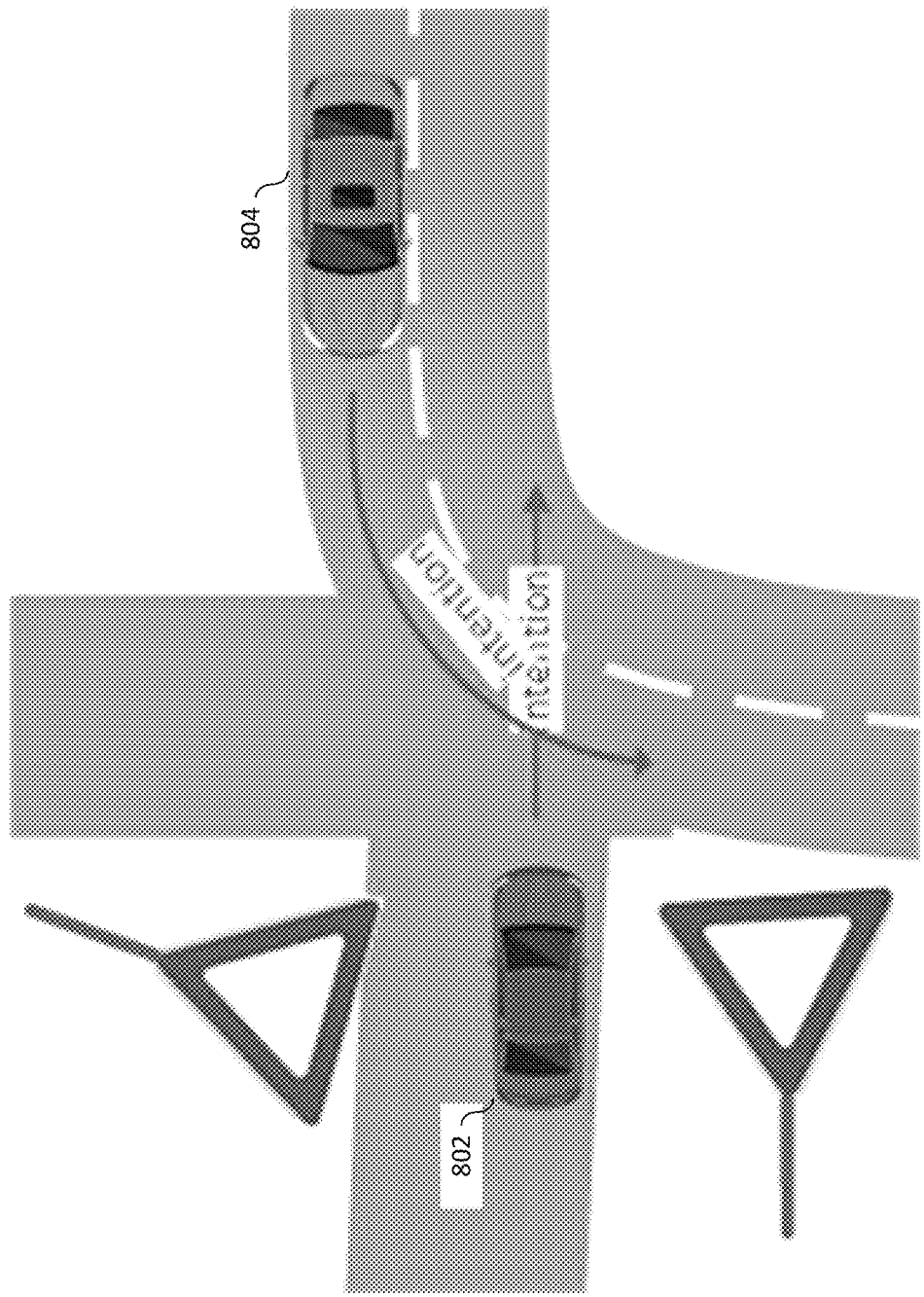
FIG. 8 illustrates a scenario in which a vehicle misjudges the need to activate a blinker, in accordance with the present disclosure.

Thus, the safe rule traffic violations monitor processing block 408C functions to detect when non-safety critical traffic rules are about to be violated and which can be safely corrected without any disruption of the main driving task. This may include the activation of a turn signal when it is predicted that the vehicle is to perform a turn but the vehicle state data indicates that the blinker has not been activated in a particular direction. An example of such a scenario is shown in further detail in FIG. 8. As shown in FIG. 8, the scenario illustrates a German road in which a driver of the vehicle 804 misjudges the need to active the blinker when navigating the curve to the left, as this is not required in other jurisdictions from which the driver of the vehicle 804 may be familiar. The safe rule traffic violations monitor processing block 408C thus identifies this mistake and outputs the information as noted in Table 6 above to the IVI 504 and/or the action execution processing block 508 via the intra-system communications, which may include the non-safety critical control data. The action execution processing block 508 and/or the IVI 504 then uses the information to cause the vehicle to autonomously activate the appropriate blinker signal.

Corrective Action Execution

This section is directed to the action performed by the vehicle based upon the particular classification or risk-based categorization of a consequence resulting from the execution of a predicted vehicle maneuver. The corrective action as discussed herein may be performed by the action execution processing block 410, which may include the individual action execution processing blocks 410A, 410B, and 410C, and/or the action execution processing block 508, which may be identified with the action execution processing block 410 as noted herein. The action execution processing block 510 may cause the vehicle 100 to perform a corrective action in response to the prediction of a particular vehicle maneuver that corresponds to one of the risk-based categories in which the consequence of executing the predicted maneuver is categorized.

Thus, the corrective action or control performed by the action execution processing block 508 may be tailored to the category of risk associated with the consequence of the predicted vehicle maneuver, as illustrated in FIG. 4. That is, when the consequence resulting from the execution of the predicted vehicle maneuver is categorized into the high-risk category, the action execution processing block 508 may generate the appropriate control output data as shown in FIG. 5. The control output data may be provided to any suitable autonomous control systems of the safety system 200, which may implement the SDM as discussed herein to cause the vehicle 100 to perform the corrective action. In this scenario of a high-risk consequence categorization of a predicted vehicle maneuver, the corrective action may correspond to an intervening vehicle control operation to prevent or modify the execution of the predicted vehicle maneuver.

To do so, and with reference to FIG. 5, the action execution processing block 508 may receive as inputs the driver control data $u_t$, which may represent the state of any suitable number of driving control variables related to the control of the vehicle 100 such as driver input for acceleration, braking, steering, etc. The 't' notation indicates that the driver control data changes over time based upon the actions of the driver 502, and thus the driver control data control data $u_t$ may represent the driver control data at a single point in time t. The action execution processing block 508 may additionally receive as inputs the assistance control data $a_t$, which represents a proper control response (preferred safe control) calculated by the vehicle's safety system 200 for the current vehicle state data $x_t$ and driver state data de at a particular point in time t in response to the detection of a particular type of predicted maneuver having a consequence that when executed is classified as a dangerous or as high-risk. Thus, the assistance control data $a_t$, may represent the initial control variables generated by the safety system 200 in accordance with the SDM, which are related to a change in vehicle position, steering, braking, acceleration, speed, etc.

The action execution processing block 508 functions to output control output data as shown in FIG. 5, represented as $o_t+1$, which represents the next cycle as determined by an operational envelope. This envelope depends on the sampling necessary for the action execution processing block 508, which again may be implemented as a controller. The controller in this scenario is generally operated at the highest frequency enabled by the vehicle actuators. The action execution processing block 506, which again may be implemented as a controller, is configured to cause the vehicle 100 to perform an intervening vehicle control operation to provide a shared control of the vehicle between the driver and autonomous vehicle controls. The action execution processing block 506 functions to generate the control output data, which is utilized by the appropriate autonomous control systems of the safety system 200. The control output data is thus used to correct human driver actions and to compensate for awareness errors (i.e. potentially dangerous situations not covered by a direct safety rule monitor, but instead by a detection of a driver inability to understand the current situation which may result in a dangerous situation in the near future).

To do so, the action execution processing block 506 may perform one or more of the following control-based actions to facilitate shared vehicle control between the driver 502 and the vehicle's autonomous control systems. It is also noted that the autonomous mode is partially activated for the perception and planning/monitoring functionality as discussed herein to observe and identify driver behavior and predict vehicle maneuvers. However, the full enablement of the autonomous mode includes the control actuation that is managed via the shared control that shared control performed via the action execution processing block 508 as discussed herein. These may be considered parallel processes for the monitoring and fusion operations, but sequential in the output since output instructions are temporal in nature:

Activate an autonomous mode but with actions certain actions being disabled. This may include the activation of the automated system to be attentive but inactive. In other words, the action execution processing block 508 may generate the output control data to cause the vehicle 100 to perform an intervening vehicle control operation. This intervening control operation may include providing shared control of the vehicle between the driver 502 and the vehicle's autonomous control systems by activating an autonomous vehicle mode having a subset of autonomous controls disabled.

Monitor human driving commands using the driver control data and evaluate potential immediate maneuvers.

Compare instant predicted vehicle maneuvers with autonomous planned maneuvers.

If a discrepancy exists between the instant predicted vehicle maneuvers and the autonomous planned maneuvers above an unacceptable uncertainty threshold, then the output control data may result in the autonomous systems completely overtaking control from the human driver. If the discrepancy between the instant predicted vehicle maneuvers and the autonomous planned maneuvers is above an acceptable threshold, then the output control data may represent a shared-control to be activated to provide subtle corrections. In other words, the discrepancy in this context may represent a difference in the calculated control to follow a defined safe trajectory and what a driver is currently (or predicted to) do. One scenario may include a driver who is supposed to turn the steering wheel to −0.4 radians, but instead the driver input data is 0.3 radians. If the difference between these two (0.7 in this scenario) is above a threshold, then this discrepancy is unacceptable The output control data may facilitate the shared control to remain active until human driver actively confirms that full control may be regained. This may include the generation of the control output data that causes the vehicle 100 to maintain the intervening vehicle control operation to provide the shared control of the vehicle until driver input is received indicating that the driver is capable of controlling the vehicle. This driver input may include monitoring the driver control data for a brake signal or other suitable input that would typically be generated from driver action. Additionally, the output control data may facilitate the shared control to be disengaged based upon conditions in addition to or instead of the monitoring of driver control data. This may include a return of full control to the driver based on the condition that both the driver's focus of attention is regained and that the input performance is adequate to the driving conditions, as indicated by a suitable input that would typically be generated from driver action as noted above. The driver's attention may be identified via an analysis of the images of the driver 404.1-404.N or any other suitable driver state data via the vehicle maneuver precaution processing block 401 as discussed herein, to ensure that the driver is focusing his or her gaze on the appropriate portion of the road corresponding to the particular direction, motion, orientation, etc. of the vehicle. In other words, the intervening vehicle control operation may be maintained to provide the shared control of the vehicle until a further analysis of the driver state data indicates that the driver's attention is focused on the road and/or a suitable input that that would typically be generated from driver action as noted above is received.

In any event, the action execution processing block 508 generates the output control data of as a weighted function that combines the driver control data or input $u_t$ and the assistance control data or input $a_t$. In other words, the action execution processing block 508 is configured to cause the vehicle 100 to perform the intervening vehicle control operation to provide shared control of the vehicle by generating the output control data $o_t$ as a weighted function, which may be expressed as shown in the non-limiting Equation 1 as follows:

$$O_t = \Sigma f(t) w(t) = w_{user} * u_t + w_{automation} * a_t. \quad \text{Eqn. 1:}$$

where $u_t$ and $w_{user}$ represent, respectively, the current driver control inputs and the current weight applied to the driver control inputs, and $a_t$ and $w_{automation}$ represent, respectively, the current assistance control inputs and their associated weight.

The action execution processing block 508 determines the values of the weights $w_{user}$, $w_{automation}$ using the difference between driver control inputs $u_t$ and the assistance control inputs $a_t$. for a safety maneuver to correct for the current predicted vehicle maneuver as well as the anticipation score output by the driver and environment monitoring processing block 506 for the current predicted vehicle maneuver. Thus, the user input weight $w_{user}$ becomes 0 as the difference between the driver control input $u_t$ and a particular safety maneuver associated with the control inputs $a_t$. increases above a configurable threshold and a sufficiently low anticipation score threshold. This allows for the AD or ADAS system used by the safety system 200 to quickly apply the safest control strategy. The manner in which the weights are determined or tuned for a particular system may form part of any suitable type of parameter tuning, which may include known techniques such as establishing the weighting values based upon the results of simulation and closed test track experimentation under reasonably foreseeable scenarios within the vehicle's Operational Design Domain.

To provide an illustrative scenario, if the driver 502 rapidly regains attention, this would result in a high anticipation score for the current predicted vehicle maneuver. Thus, the input difference between the driver control inputs $u_t$ and the assistance control inputs at diminishes, and the action execution processing block 508 may increment the $w_{user}$ weight exponentially (reducing equally $w_{automation}$ to allow rapid transition of control to the driver 502).

However if the anticipation score for the predicted vehicle maneuver is high (i.e. above a configurable threshold value), and the driver control inputs $u_t$ are still above a configurable threshold value, then the weight $w_{user}$ may be increased only linearly with time to avoid the driver 502 from forcing the vehicle 100 into an over/under steer condition as a result of a panicked response to the dangerous situation. With this in mind, the action execution processing block 508 may output the output control data $o_t$ having user control input weightings $w_{user}$ in accordance with the non-limiting conditions shown in Equation 2 below. Of course, the number and/or types of conditions and/or relationships among these variables and weights may be modified from what is illustrated in Equation 2 depending upon the particular implementation and application.

$$w_{user}(t) = \begin{cases} 0 & \text{if } A_{score} < A_{threshold} \text{ and } \Delta U > U_{threshold}, \\ \alpha(1+\phi)^t & \text{if } A_{score} \geq A_{threshold} \text{ and } \Delta U \leq U_{threshold}, \\ \phi(t) + \alpha & \text{if } A_{score} \geq A_{threshold} \text{ and } \Delta U > U_{threshold} \end{cases} \quad \text{Eqn. 2}$$

Where $A_{score}$ represents the anticipation score for a particular predicted vehicle maneuver, $A_{threshold}$ represents the configurable anticipation score threshold value, $\Delta U$ represents the difference between the driver control inputs $u_t$ and the assistance control inputs $a_t$, $U_{threshold}$ represents another configurable threshold value, and $\alpha$ and $\phi$ represent, respectively, parameters for the minimum initial value assigned to weight $w_{user}$ and the growth rate depending on the involved danger or risk. These parameters may be adjusted using any known techniques depending upon the particular implementation and application, including known techniques to do so. It is noted that the α parameter shown in Eqn. 2 is distinct and different than the weighting as illustrated and discussed above with reference to the weighted anticipatory score shown in FIG. 6.

Again, the corrective action or control performed by the action execution processing block 508 may be tailored to the category of risk associated with the consequence of the predicted vehicle maneuver, as illustrated in FIG. 4. Thus, when the consequence resulting from the execution of the predicted vehicle maneuver is categorized into the mid-risk category, the action execution processing block 508 may generate the appropriate user warning data as shown in FIG. 5. Alternatively, the user warning data may be transmitted from the driver and environment monitoring processing block 506 to the IVI 504 in addition to or instead of the action execution processing block 508 doing so.

Regardless of the particular component that generates and transmits the user warning data to the IVI 504, the driver and environment monitoring processing block 506 and/or the action execution processing block 508 may receive as inputs a list of estimated driver mistakes, which may be identified with the data output by the atypical behaviors monitor processing block 408B as shown and described above with reference to Table 5. The driver and environment monitoring processing block 506 and/or the action execution processing block 508 thus functions to provide a visual/auditory notification to the driver 502 about the estimated driver mistake. The user warning data may thus include any suitable type of encoded data that enables the IVI 504 to issue a suitable notification such as direct speech and/or a text message/notification to the driver 502.

Additionally or alternatively, the driver 502's reaction to such an announcement/warning may be monitored and evaluated as discussed herein to determine if an over-reaction occurs. This may be performed via the implementation of a closed-loop solution in which the actions of the driver 502 after receiving the notification are observed and evaluated for abrupt changes that would lead to an unsafe situation by triggering one or more of the consequence classifications via the consequence monitor processing blocks 408A, 408B, 408C as described above. That is, the driver and environment monitoring processing block 506 may be configured to predict an additional vehicle maneuver based upon the analysis of the images 402.1-402.N, 404.1-404.N, the driver state data, the vehicle state data, etc., after a notification is generated and provided to the driver 502. The driver and environment monitoring processing block may then categorize a consequence resulting from an execution of the additional predicted vehicle maneuver into one of the plurality of risk-based categories, as noted above, such that the driver's reaction to the issued warning may be monitored in a similar manner as other reactions while driving as described herein. In this way, in the case of an over-reaction, the action execution processing block 508 may activate the shared-control as noted above to ensure safe vehicle maneuvers.

Again, the corrective action or control performed by the action execution processing block 508 may be tailored to the category of risk associated with the consequence of the predicted vehicle maneuver, as illustrated in FIG. 4. Thus, when the consequence resulting from the execution of the predicted vehicle maneuver is categorized into the low-risk category, the action execution processing block 508 and/or the IVI 504 may correct the predicted non-safety-critical violation in an autonomous manner that is transparent to the driver 502. To implement this functionality, the action execution processing block 508 and/or the IVI 504 may receive as inputs a list of non-safety-critical predicted violations for performing a vehicle maneuver (such as the non-safety critical control data), which may be identified with the data output by the safe traffic rule violations monitor processing block 408C as shown and described above with reference to Table 6.

The action execution processing block 508 thus functions to autonomously correct for a predicted violation. This may be implemented by accessing any suitable memory, database, etc., which may constitute a part of the safety system 200 or another external component not shown in the Figures. In any event, the memory or database may store any suitable number of predetermined violation/actions pairs. This may include violations such as a missing blinking turn signal in a particular direction paired with the activation of the turn signal control for a certain time period corresponding to that same direction. This may be facilitated via the use of the output control data or other suitable communication and control with the vehicle 100's safety system 200 as discussed herein.

Figure 9:
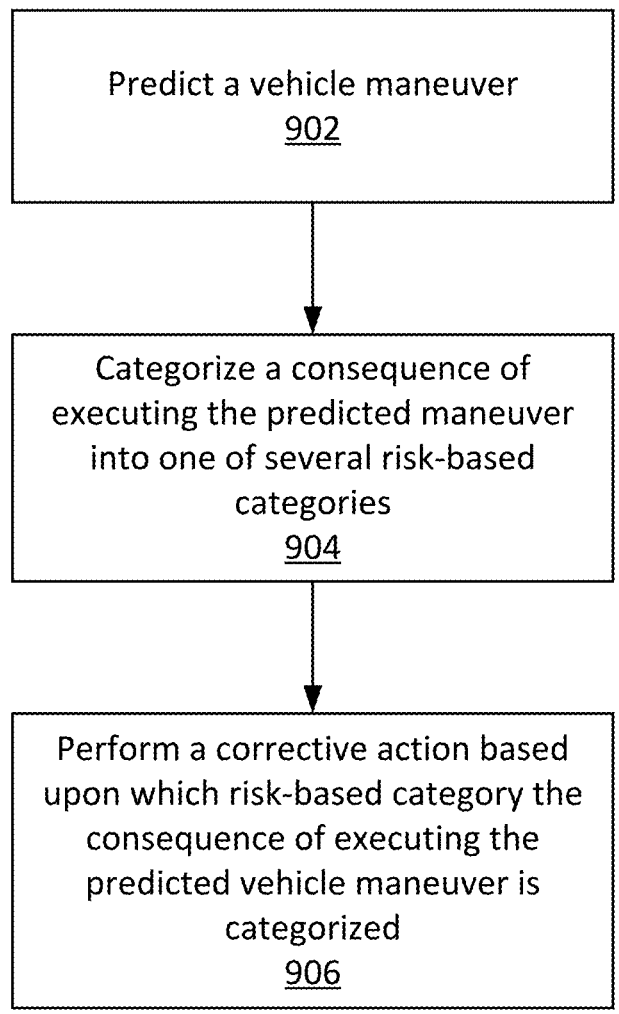
FIG. 9 illustrates a process flow, in accordance with the present disclosure.

FIG. 9 illustrates a process flow. With reference to FIG. 9, the flow 900 may be a computer-implemented method executed by and/or otherwise associated with one or more processors (processing circuitry) and/or storage devices. These processors and/or storage devices may be, for instance, associated with one or more components of a vehicle 100 as discussed herein with reference to FIG. 1. The processors and/or storage devices may be identified with the one or more processors 102 and/or one or more of the application processors 214A, 214B, image processor 216, communication processor 218, etc., executing computer-readable instructions stored in the memory 202, as shown and described herein with reference to FIG. 2. The one or more processors 102 and/or one or more of the application processors 214A, 214B, image processor 216, communication processor 218, etc. may additionally or alternatively work exclusively as hardware components (processing circuitry or other suitable circuitry), execute instructions stored on other computer-readable storage mediums not shown in the Figures (which may be locally-stored instructions as part of the processing circuitries themselves), and any combination thereof. The various vehicle components used to perform the method 900 may include various components as discussed herein such as the maneuver prediction processing block 401, the consequence monitor processing block 408, the action execution processing block 410, the driver and environment monitoring processing block 506 and/or the action execution processing block 508, etc. The flow 900 may include alternate or additional steps that are not shown in FIG. 9 for purposes of brevity, and may be performed in a different order than the steps shown in FIG. 9.

Flow 900 may begin when one or more processors predict (block 902) a vehicle maneuver. These vehicle maneuvers may include, a left turn, a right turn, a left lane change, a right lane change, the vehicle continuing to move straight ahead, etc. This may include the classification of vehicle maneuvers using the maximum anticipation scores as discussed herein with reference to FIG. 6 via the use of the 3D CNNs 604.01, 604.2.

Flow 900 may include one or more processors categorizing (block 904) the consequence of executing the predicted maneuver into one of several risk-based categories. This may include the categorization of the consequence of the predicted vehicle maneuver into one of the high-, mid-, and low-risk categories as discussed herein, which may be determined via the consequence monitors processing blocks 408 as shown in FIG. 4.

Flow 900 may include one or more processors performing (block 906) a corrective action based upon the risk-based category into which the consequence of performing the predicted vehicle maneuver is categorized. As noted above, this may include the shared-control between the driver and the autonomous vehicle systems, issuing a user warning, autonomously correcting for a safety-rule violation, etc.

EXAMPLES

The following examples pertain to various techniques of the present disclosure.

An example (e.g. example 1) relates to a vehicle. The vehicle includes monitoring circuitry configured to (i) predict a vehicle maneuver based upon an analysis of driver state data and vehicle state data, and (ii) categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and a controller configured to cause the vehicle to perform a corrective action corresponding to which one of the plurality of risk-based categories that the consequence resulting from the execution of the predicted vehicle maneuver is categorized.

Another example (e.g. example 2) relates to a previously-described example (e.g. example 1), wherein the plurality of risk-based categories includes a high-risk category associated with the predicted vehicle maneuver matching one of a set of predetermined vehicle maneuvers when executed, a mid-risk category associated with an occurrence of atypical driver behavior associated with the predicted vehicle maneuver being executed, and a low-risk category associated with an occurrence of a violation of a non-safety critical traffic rule associated with the predicted vehicle maneuver being executed.

Another example (e.g. example 3) relates to a previously-described example (e.g. one or more of examples 1-2), wherein the plurality of risk-based categories include a high-risk category associated with the predicted vehicle maneuver matching one of a set of predetermined vehicle maneuvers when executed, and wherein the controller is configured to, when the consequence resulting from the execution of the predicted vehicle maneuver is categorized in the high-risk category, cause the vehicle to perform the corrective action corresponding to an intervening vehicle control operation to prevent the execution of the predicted vehicle maneuver.

Another example (e.g. example 4) relates to a previously-described example (e.g. one or more of examples 1-3), wherein the controller is configured to cause the vehicle to perform the intervening vehicle control operation to provide a shared control of the vehicle between the driver and autonomous vehicle controls.

Another example (e.g. example 5) relates to a previously-described example (e.g. one or more of examples 1-4), wherein the controller is configured to cause the vehicle to perform the intervening vehicle control operation to provide the shared control of the vehicle by generating a weighted function that includes a first weighting applied to user vehicle control inputs, and a second weighting applied to autonomous vehicle control inputs.

Another example (e.g. example 6) relates to a previously-described example (e.g. one or more of examples 1-5), wherein the controller is configured to cause the vehicle to maintain the intervening vehicle control operation to provide the shared control of the vehicle until an input is received indicating that the driver is capable of controlling the vehicle.

Another example (e.g. example 7) relates to a previously-described example (e.g. one or more of examples 1-6), wherein the controller is further configured to cause the vehicle to maintain the intervening vehicle control operation to provide the shared control of the vehicle until the driver state data indicates that the driver has regained focus.

Another example (e.g. example 8) relates to a previously-described example (e.g. one or more of examples 1-7), wherein the plurality of risk-based categories include a mid-risk category associated with atypical driver behavior, the atypical driver behavior being associated with the predicted vehicle maneuver being executed, and wherein the controller is configured to, when the consequence resulting from the execution of the predicted vehicle maneuver is categorized as the mid-risk category, cause the vehicle to perform the corrective action corresponding to the generation of a notification to the driver about the atypical driver behavior.

Another example (e.g. example 9) relates to a previously-described example (e.g. one or more of examples 1-8), wherein the monitoring circuitry is configured to predict an additional vehicle maneuver based upon the analysis of the driver state data after the notification is generated, and to categorize a consequence resulting from an execution of the additional predicted vehicle maneuver into one of the plurality of risk-based categories.

Another example (e.g. example 10) relates to a previously-described example (e.g. one or more of examples 1-9), wherein the plurality of risk-based categories include a low-risk category associated with an occurrence of a violation of a non-safety critical traffic rule associated with the predicted vehicle maneuver being executed, and wherein the controller is configured to, when the consequence resulting from the execution of the predicted vehicle maneuver is categorized as the low-risk category, cause the vehicle to autonomously activate a vehicle component to correct for the occurrence of the violation of the non-safety critical traffic rule.

An example (e.g. example 11) relates to a controller of a vehicle. The controller includes a data interface configured to provide driver state data and vehicle state data; and one or more processors configured to: predict a vehicle maneuver based upon an analysis of the driver state data and the vehicle state data; categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and cause the vehicle to perform a corrective action corresponding to which one of the plurality of risk-based categories that the consequence resulting from the execution of the predicted vehicle maneuver is categorized.

Another example (e.g. example 12) relates to a previously-described example (e.g. example 11), wherein the plurality of risk-based categories includes a high-risk category associated with the predicted vehicle maneuver matching one of a set of predetermined vehicle maneuvers when executed, a mid-risk category associated with an occurrence of atypical driver behavior associated with the predicted vehicle maneuver being executed, and a low-risk category associated with an occurrence of a violation of a non-safety critical traffic rule associated with the predicted vehicle maneuver being executed.

Another example (e.g. example 13) relates to a previously-described example (e.g. one or more of examples 11-12), wherein the plurality of risk-based categories include a high-risk category associated with the predicted vehicle maneuver matching one of a set of predetermined vehicle maneuvers when executed, and wherein the one or more processors are configured to, when the consequence resulting from the execution of the predicted vehicle maneuver is categorized in the high-risk category, cause the vehicle to perform the corrective action corresponding to an intervening vehicle control operation to prevent the execution of the predicted vehicle maneuver.

Another example (e.g. example 14) relates to a previously-described example (e.g. one or more of examples 11-13), wherein the one or more processors are configured to cause the vehicle to perform the intervening vehicle control operation to provide a shared control of the vehicle between the driver and autonomous vehicle controls.

Another example (e.g. example 15) relates to a previously-described example (e.g. one or more of examples 11-14), wherein the one or more processors are configured to cause the vehicle to perform the intervening vehicle control operation to provide the shared control of the vehicle by generating a weighted function that includes a first weighting applied to user vehicle control inputs, and a second weighting applied to autonomous vehicle control inputs.

Another example (e.g. example 16) relates to a previously-described example (e.g. one or more of examples 11-15), wherein the one or more processors are configured to cause the vehicle to maintain the intervening vehicle control operation to provide the shared control of the vehicle until an input is received indicating that the driver is capable of controlling the vehicle.

Another example (e.g. example 17) relates to a previously-described example (e.g. one or more of examples 11-16), wherein the one or more processors are further configured to cause the vehicle to maintain the intervening vehicle control operation to provide the shared control of the vehicle until the driver state data indicates that the driver has regained focus.

Another example (e.g. example 18) relates to a previously-described example (e.g. one or more of examples 11-17), wherein the plurality of risk-based categories include a mid-risk category associated with an occurrence of atypical driver behavior associated with the predicted vehicle maneuver being executed, and wherein the one or more processors are configured to, when the consequence resulting from the execution of the predicted vehicle maneuver is categorized as the mid-risk category, cause the vehicle to perform the corrective action corresponding to the generation of a notification to the driver about the atypical driver behavior.

Another example (e.g. example 19) relates to a previously-described example (e.g. one or more of examples 11-18), wherein the one or more processors are configured to predict an additional vehicle maneuver based upon the analysis of the driver state data after the notification is generated, and to categorize a consequence resulting from an execution of the additional predicted vehicle maneuver into one of the plurality of risk-based categories.

Another example (e.g. example 20) relates to a previously-described example (e.g. one or more of examples 11-19), wherein the plurality of risk-based categories include a low-risk category associated with an occurrence of a violation of a non-safety critical traffic rule associated with the predicted vehicle maneuver being executed, and wherein the one or more processors are configured to, when the consequence resulting from the execution of the predicted vehicle maneuver is categorized as the low-risk category, cause the vehicle to autonomously activate a vehicle component to correct for the occurrence of the violation of the non-safety critical traffic rule.

An example (e.g. example 21) relates to a non-transitory computer-readable medium of a vehicle. The non-transitory computer-readable medium has instructions stored thereon that, when executed by one or more processors of the vehicle, cause the vehicle to: predict a vehicle maneuver based upon an analysis of driver state data associated with a driver of the vehicle and vehicle state data; categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and cause the vehicle to perform a corrective action corresponding to which one of the plurality of risk-based categories that the consequence resulting from the execution of the predicted vehicle maneuver is categorized.

Another example (e.g. example 22) relates to a previously-described example (e.g. example 21), wherein the plurality of risk-based categories include a high risk category associated resulting from the predicted vehicle maneuver matching one of a set of predetermined dangerous vehicle maneuvers when executed, a mid-risk category associated with an occurrence of atypical driver behavior when the predicted vehicle maneuver will be executed, and a low-risk category associated with an occurrence of a violation of a non-safety critical traffic rule when the predicted vehicle maneuver will be executed.

Another example (e.g. example 23) relates to a previously-described example (e.g. one or more of examples 21-22), wherein the plurality of risk-based categories include a high risk category associated resulting from the predicted vehicle maneuver matching one of a set of predetermined dangerous vehicle maneuvers when executed, and wherein the instructions, when executed by one or more processors of the vehicle, cause the vehicle to, when the consequence resulting from the execution of the predicted vehicle maneuver is categorized as the high-risk category, perform the corrective action corresponding to an intervening vehicle control-based operation to prevent the execution of the predicted vehicle maneuver.

Another example (e.g. example 24) relates to a previously-described example (e.g. one or more of examples 21-23), wherein: the plurality of risk-based categories include a mid-risk category associated with an occurrence of atypical driver behavior when the predicted vehicle maneuver will be executed, the plurality of risk-based categories include a low-risk category associated with an occurrence of a violation of a non-safety critical traffic rule when the predicted driving maneuver will be executed, and the instructions, when executed by one or more processors of the vehicle, cause the vehicle to: when the consequence resulting from the execution of the predicted vehicle maneuver is categorized as the mid-risk category, perform the corrective action corresponding to the generation of a notification to the driver about the atypical driver behavior; and when the consequence resulting from the execution of the predicted vehicle maneuver is categorized as the low-risk category, cause the vehicle to autonomously activate a vehicle component to correct for the occurrence of the violation of the non-safety critical traffic rule.

An example (e.g. example 25) relates to a vehicle. The vehicle includes monitoring means for (i) predicting a vehicle maneuver based upon an analysis of driver state data and vehicle state data, and (ii) categorizing a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and a controller means for causing the vehicle to perform a corrective action corresponding to which one of the plurality of risk-based categories that the consequence resulting from the execution of the predicted vehicle maneuver is categorized.

Another example (e.g. example 26) relates to a previously-described example (e.g. example 25), wherein the plurality of risk-based categories includes a high-risk category associated with the predicted vehicle maneuver matching one of a set of predetermined vehicle maneuvers when executed, a mid-risk category associated with an occurrence of atypical driver behavior associated with the predicted vehicle maneuver being executed, and a low-risk category associated with an occurrence of a violation of a non-safety critical traffic rule associated with the predicted vehicle maneuver being executed.

Another example (e.g. example 27) relates to a previously-described example (e.g. one or more of examples 25-26), wherein the plurality of risk-based categories include a high-risk category associated with the predicted vehicle maneuver matching one of a set of predetermined vehicle maneuvers when executed, and wherein the controller means, when the consequence resulting from the execution of the predicted vehicle maneuver is categorized in the high-risk category, causes the vehicle to perform the corrective action corresponding to an intervening vehicle control operation to prevent the execution of the predicted vehicle maneuver.

Another example (e.g. example 28) relates to a previously-described example (e.g. one or more of examples 25-27), wherein the controller means causes the vehicle to perform the intervening vehicle control operation to provide a shared control of the vehicle between the driver and autonomous vehicle controls.

Another example (e.g. example 29) relates to a previously-described example (e.g. one or more of examples 25-28), wherein the controller means causes the vehicle to perform the intervening vehicle control operation to provide the shared control of the vehicle by generating a weighted function that includes a first weighting applied to user vehicle control inputs, and a second weighting applied to autonomous vehicle control inputs.

Another example (e.g. example 30) relates to a previously-described example (e.g. one or more of examples 25-29), wherein the controller means causes the vehicle to maintain the intervening vehicle control operation to provide the shared control of the vehicle until an input is received indicating that the driver is capable of controlling the vehicle.

Another example (e.g. example 31) relates to a previously-described example (e.g. one or more of examples 25-30), wherein the controller means causes the vehicle to maintain the intervening vehicle control operation to provide the shared control of the vehicle until the driver state data indicates that the driver has regained focus.

Another example (e.g. example 32) relates to a previously-described example (e.g. one or more of examples 25-31), wherein the plurality of risk-based categories include a mid-risk category associated with atypical driver behavior, the atypical driver behavior being associated with the predicted vehicle maneuver being executed, and wherein the controller means, when the consequence resulting from the execution of the predicted vehicle maneuver is categorized as the mid-risk category, causes the vehicle to perform the corrective action corresponding to the generation of a notification to the driver about the atypical driver behavior.

Another example (e.g. example 33) relates to a previously-described example (e.g. one or more of examples 25-32), wherein the monitoring means predicts an additional vehicle maneuver based upon the analysis of the driver state data after the notification is generated, and categorizes a consequence resulting from an execution of the additional predicted vehicle maneuver into one of the plurality of risk-based categories.

Another example (e.g. example 34) relates to a previously-described example (e.g. one or more of examples 25-33), wherein the plurality of risk-based categories include a low-risk category associated with an occurrence of a violation of a non-safety critical traffic rule associated with the predicted vehicle maneuver being executed, and wherein the controller means, when the consequence resulting from the execution of the predicted vehicle maneuver is categorized as the low-risk category, causes the vehicle to autonomously activate a vehicle component to correct for the occurrence of the violation of the non-safety critical traffic rule.

An example (e.g. example 35) relates to a controller means of a vehicle. The controller means includes a data interface means for providing driver state data and vehicle state data; and a processing means for: predicting a vehicle maneuver based upon an analysis of the driver state data and the vehicle state data; categorizing a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and causing the vehicle to perform a corrective action corresponding to which one of the plurality of risk-based categories that the consequence resulting from the execution of the predicted vehicle maneuver is categorized.

Another example (e.g. example 36) relates to a previously-described example (e.g. example 35), wherein the plurality of risk-based categories includes a high-risk category associated with the predicted vehicle maneuver matching one of a set of predetermined vehicle maneuvers when executed, a mid-risk category associated with an occurrence of atypical driver behavior associated with the predicted vehicle maneuver being executed, and a low-risk category associated with an occurrence of a violation of a non-safety critical traffic rule associated with the predicted vehicle maneuver being executed.

Another example (e.g. example 37) relates to a previously-described example (e.g. one or more of examples 35-36), wherein the plurality of risk-based categories include a high-risk category associated with the predicted vehicle maneuver matching one of a set of predetermined vehicle maneuvers when executed, and wherein the processing means, when the consequence resulting from the execution of the predicted vehicle maneuver is categorized in the high-risk category, causes the vehicle to perform the corrective action corresponding to an intervening vehicle control operation to prevent the execution of the predicted vehicle maneuver.

Another example (e.g. example 38) relates to a previously-described example (e.g. one or more of examples 35-37), wherein the processing means causes the vehicle to perform the intervening vehicle control operation to provide a shared control of the vehicle between the driver and autonomous vehicle controls.

Another example (e.g. example 39) relates to a previously-described example (e.g. one or more of examples 35-38), wherein the processing means causes the vehicle to perform the intervening vehicle control operation to provide the shared control of the vehicle by generating a weighted function that includes a first weighting applied to user vehicle control inputs, and a second weighting applied to autonomous vehicle control inputs.

Another example (e.g. example 40) relates to a previously-described example (e.g. one or more of examples 35-39), wherein the processing means causes the vehicle to maintain the intervening vehicle control operation to provide the shared control of the vehicle until an input is received indicating that the driver is capable of controlling the vehicle.

Another example (e.g. example 41) relates to a previously-described example (e.g. one or more of examples 35-40), wherein the processing means cause the vehicle to maintain the intervening vehicle control operation to provide the shared control of the vehicle until the driver state data indicates that the driver has regained focus.

Another example (e.g. example 42) relates to a previously-described example (e.g. one or more of examples 35-41), wherein the plurality of risk-based categories include a mid-risk category associated with an occurrence of atypical driver behavior associated with the predicted vehicle maneuver being executed, and wherein the processing means, when the consequence resulting from the execution of the predicted vehicle maneuver is categorized as the mid-risk category, causes the vehicle to perform the corrective action corresponding to the generation of a notification to the driver about the atypical driver behavior.

Another example (e.g. example 43) relates to a previously-described example (e.g. one or more of examples 35-42), wherein the processing means predicts an additional vehicle maneuver based upon the analysis of the driver state data after the notification is generated, and categorizes a consequence resulting from an execution of the additional predicted vehicle maneuver into one of the plurality of risk-based categories.

Another example (e.g. example 44) relates to a previously-described example (e.g. one or more of examples 35-43), wherein the plurality of risk-based categories include a low-risk category associated with an occurrence of a violation of a non-safety critical traffic rule associated with the predicted vehicle maneuver being executed, and wherein the processing means, when the consequence resulting from the execution of the predicted vehicle maneuver is categorized as the low-risk category, causes the vehicle to autonomously activate a vehicle component to correct for the occurrence of the violation of the non-safety critical traffic rule.

An example (e.g. example 45) relates to a non-transitory computer-readable medium of a vehicle. The non-transitory computer-readable medium has instructions stored thereon that, when executed by the processing means of the vehicle, cause the vehicle to: predict a vehicle maneuver based upon an analysis of driver state data associated with a driver of the vehicle and vehicle state data; categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and cause the vehicle to perform a corrective action corresponding to which one of the plurality of risk-based categories that the consequence resulting from the execution of the predicted vehicle maneuver is categorized.

Another example (e.g. example 46) relates to a previously-described example (e.g. example 45), wherein the plurality of risk-based categories include a high risk category associated resulting from the predicted vehicle maneuver matching one of a set of predetermined dangerous vehicle maneuvers when executed, a mid-risk category associated with an occurrence of atypical driver behavior when the predicted vehicle maneuver will be executed, and a low-risk category associated with an occurrence of a violation of a non-safety critical traffic rule when the predicted vehicle maneuver will be executed.

Another example (e.g. example 47) relates to a previously-described example (e.g. one or more of examples 45-46), wherein the plurality of risk-based categories include a high risk category associated resulting from the predicted vehicle maneuver matching one of a set of predetermined dangerous vehicle maneuvers when executed, and wherein the instructions, when executed by the processing means of the vehicle, cause the vehicle to, when the consequence resulting from the execution of the predicted vehicle maneuver is categorized as the high-risk category, perform the corrective action corresponding to an intervening vehicle control-based operation to prevent the execution of the predicted vehicle maneuver.

Another example (e.g. example 48) relates to a previously-described example (e.g. one or more of examples 45-47), wherein: the plurality of risk-based categories include a mid-risk category associated with an occurrence of atypical driver behavior when the predicted vehicle maneuver will be executed, the plurality of risk-based categories include a low-risk category associated with an occurrence of a violation of a non-safety critical traffic rule when the predicted driving maneuver will be executed, and the instructions, when executed by the processing means of the vehicle, cause the vehicle to: when the consequence resulting from the execution of the predicted vehicle maneuver is categorized as the mid-risk category, perform the corrective action corresponding to the generation of a notification to the driver about the atypical driver behavior; and when the consequence resulting from the execution of the predicted vehicle maneuver is categorized as the low-risk category, cause the vehicle to autonomously activate a vehicle component to correct for the occurrence of the violation of the non-safety critical traffic rule.

An apparatus as shown and described.

A method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

The designs of the disclosure may be implemented in hardware (e.g., circuits), firmware, software, or any combination thereof. Designs may also be implemented as instructions stored on a machine-readable medium, which may be read and executed by one or more processors. A machine-readable medium may include any mechanism for storing or transmitting information in a form readable by a machine (e.g., a computing device). A machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned data types and may take various forms and represent any information as understood in the art.

The terms "processor" or "controller" as used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

In one or more of the implementations described herein, processing circuitry can include memory that stores data and/or instructions. The memory can be any well-known volatile and/or non-volatile memory, including read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). A processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. A vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, and the like.

The term "autonomous vehicle" may describe a vehicle that implements all or substantially all navigational changes, at least during some (significant) part (spatial or temporal, e.g., in certain areas, or when ambient conditions are fair, or on highways, or above or below a certain speed) of some drives. Sometimes an "autonomous vehicle" is distinguished from a "partially autonomous vehicle" or a "semi-autonomous vehicle" to indicate that the vehicle is capable of implementing some (but not all) navigational changes, possibly at certain times, under certain conditions, or in certain areas. A navigational change may describe or include a change in one or more of steering, braking, or acceleration/deceleration of the vehicle. A vehicle may be described as autonomous even in case the vehicle is not fully automatic (fully operational with driver or without driver input). Autonomous vehicles may include those vehicles that can operate under driver control during certain time periods and without driver control during other time periods. Autonomous vehicles may also include vehicles that control only some implementations of vehicle navigation, such as steering (e.g., to maintain a vehicle course between vehicle lane constraints) or some steering operations under certain circumstances (but not under all circumstances), but may leave other implementations of vehicle navigation to the driver (e.g., braking or braking under certain circumstances). Autonomous vehicles may also include vehicles that share the control of one or more implementations of vehicle navigation under certain circumstances (e.g., hands-on, such as responsive to a driver input) and vehicles that control one or more implementations of vehicle navigation under certain circumstances (e.g., hands-off, such as independent of driver input). Autonomous vehicles may also include vehicles that control one or more implementations of vehicle navigation under certain circumstances, such as under certain environmental conditions (e.g., spatial areas, roadway conditions). In some implementations, autonomous vehicles may handle some or all implementations of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (as defined by the SAE in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

What is claimed is:

1. A vehicle, comprising:
maneuver prediction processing circuitry configured to:
receive a first data stream comprising driver state data that includes images of a driver of the vehicle;
receive a second data stream comprising vehicle state data that includes images of an exterior of the vehicle,
wherein the first data stream and the second data stream are received concurrently and within a sampling window of a predetermined time duration;
upon expiration of the predetermined time duration, (i) calculate, based upon an analysis of the images of the driver of the vehicle, a first probability from among a first set of probabilities of execution of each respective one of a first set of vehicle maneuvers, (ii) calculate, based upon an analysis of the images of the exterior of the vehicle, a second probability from among a second set of probabilities of execution of each respective one of a second set of vehicle maneuvers, and (iii) predict a vehicle maneuver based upon a weighted combination of the first probability and the second probability;
monitoring circuitry configured to categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and
a controller configured to cause the vehicle to perform a corrective action that is based upon the one of the plurality of risk-based categories that the consequence resulting from the execution of the predicted vehicle maneuver is categorized.

2. The vehicle of claim 1, wherein the plurality of risk-based categories includes a high-risk category associated with the predicted vehicle maneuver matching one of a set of predetermined vehicle maneuvers when executed, a mid-risk category associated with an occurrence of atypical driver behavior associated with the predicted vehicle maneuver being executed, and a low-risk category associated with an occurrence of a violation of a non-safety critical traffic rule associated with the predicted vehicle maneuver being executed.

3. The vehicle of claim 1, wherein the plurality of risk-based categories includes a high-risk category associated with the predicted vehicle maneuver matching one of a set of predetermined vehicle maneuvers when executed, and
wherein the controller is configured to, when the consequence resulting from the execution of the predicted vehicle maneuver is categorized in the high-risk category, cause the vehicle to perform the corrective action corresponding to an intervening vehicle control operation to prevent the execution of the predicted vehicle maneuver.

4. The vehicle of claim 3, wherein the controller is configured to cause the vehicle to perform the intervening vehicle control operation to provide a shared control of the vehicle between a driver and autonomous vehicle controls.

5. The vehicle of claim 4, wherein the controller is configured to cause the vehicle to perform the intervening vehicle control operation to provide the shared control of the vehicle by generating a weighted function that includes a first weighting applied to driver vehicle control inputs, and a second weighting applied to autonomous vehicle control inputs.

6. The vehicle of claim 4, wherein the controller is configured to cause the vehicle to maintain the intervening vehicle control operation to provide the shared control of the vehicle until an input is received indicating that the driver is capable of controlling the vehicle.

7. The vehicle of claim 6, wherein the controller is further configured to cause the vehicle to maintain the intervening vehicle control operation to provide the shared control of the vehicle until the driver state data indicates that the driver has regained focus.

8. The vehicle of claim 1, wherein the plurality of risk-based categories includes a mid-risk category associated with atypical driver behavior, the atypical driver behavior being associated with the predicted vehicle maneuver being executed, and
wherein the controller is configured to, when the consequence resulting from the execution of the predicted vehicle maneuver is categorized as the mid-risk category, cause the vehicle to perform the corrective action corresponding to a generation of a notification to the driver about the atypical driver behavior.

9. The vehicle of claim 8, wherein the maneuver prediction processing circuitry is configured to predict an additional vehicle maneuver based upon the analysis of the driver state data after the notification is generated, and
wherein the monitoring circuitry is configured to categorize a consequence resulting from an execution of the additional predicted vehicle maneuver into one of the plurality of risk-based categories.

10. The vehicle of claim 1, wherein the plurality of risk-based categories includes a low-risk category associated with an occurrence of a violation of a non-safety critical traffic rule associated with the predicted vehicle maneuver being executed, and
wherein the controller is configured to, when the consequence resulting from the execution of the predicted vehicle maneuver is categorized as the low-risk category, cause the vehicle to autonomously activate a vehicle component to correct for the occurrence of the violation of the non-safety critical traffic rule.

11. The vehicle of claim 1, wherein the controller is configured to cause the vehicle to perform one of a set of different corrective actions, each one of the set of different corrective actions being assigned to a respective one of the plurality of risk-based categories that the consequence resulting from the execution of the predicted vehicle maneuver is categorized, and
wherein the set of different corrective actions comprise different levels of vehicle intervention with respect to vehicle control.

12. The vehicle of claim 1, wherein the first probability comprises a maximum probability from among the first set of probabilities, and
wherein the second probability comprises a maximum probability from among the second set of probabilities.

13. A controller of a vehicle, comprising:
a data interface configured to:
provide a first data stream comprising driver state data that includes images of a driver of the vehicle;
provide a second data stream comprising vehicle state data that includes images of an exterior of the vehicle,
wherein the first data stream and the second data stream are received concurrently and within a sampling window of a predetermined time duration; and
one or more processors configured to:
upon expiration of the predetermined time duration, (i) calculate, based upon an analysis of the images of the driver of the vehicle, a first probability from among a first set of probabilities of execution of each respective one of a first set of vehicle maneuvers, (ii) calculate, based upon an analysis of the images of the exterior of the vehicle, a second probability from among a second set of probabilities of execution of each respective one of a second set of vehicle maneuvers, and (iii) predict a vehicle maneuver based upon a weighted combination of the first probability and the second probability;
categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and
cause the vehicle to perform a corrective action that is based upon the one of the plurality of risk-based categories that the consequence resulting from the execution of the predicted vehicle maneuver is categorized.

14. The controller of claim 13, wherein the plurality of risk-based categories includes a high-risk category associated with the predicted vehicle maneuver matching one of a set of predetermined vehicle maneuvers when executed, a mid-risk category associated with an occurrence of atypical driver behavior associated with the predicted vehicle maneuver being executed, and a low-risk category associated with an occurrence of a violation of a non-safety critical traffic rule associated with the predicted vehicle maneuver being executed.

15. The controller of claim 13, wherein the plurality of risk-based categories includes a high-risk category associated with the predicted vehicle maneuver matching one of a set of predetermined vehicle maneuvers when executed, and
wherein the one or more processors are configured to, when the consequence resulting from the execution of the predicted vehicle maneuver is categorized in the high-risk category, cause the vehicle to perform the corrective action corresponding to an intervening vehicle control operation to prevent the execution of the predicted vehicle maneuver.

16. The controller of claim 15, wherein the one or more processors are configured to cause the vehicle to perform the intervening vehicle control operation to provide a shared control of the vehicle between the driver and autonomous vehicle controls.

17. The controller of claim 16, wherein the one or more processors are configured to cause the vehicle to perform the intervening vehicle control operation to provide the shared control of the vehicle by generating a weighted function that includes a first weighting applied to user vehicle control inputs, and a second weighting applied to autonomous vehicle control inputs.

18. The controller of claim 16, wherein the one or more processors are configured to cause the vehicle to maintain the intervening vehicle control operation to provide the shared control of the vehicle until an input is received indicating that the driver is capable of controlling the vehicle.

19. The controller of claim 18, wherein the one or more processors are further configured to cause the vehicle to maintain the intervening vehicle control operation to provide the shared control of the vehicle until the driver state data indicates that the driver has regained focus.

20. The controller of claim 13, wherein the plurality of risk-based categories includes a mid-risk category associated with an occurrence of atypical driver behavior associated with the predicted vehicle maneuver being executed, and wherein the one or more processors are configured to, when the consequence resulting from the execution of the predicted vehicle maneuver is categorized as the mid-risk category, cause the vehicle to perform the corrective action corresponding to a generation of a notification to the driver about the atypical driver behavior.

21. The controller of claim 20, wherein the one or more processors are configured to predict an additional vehicle maneuver based upon the analysis of the driver state data after the notification is generated, and to categorize a consequence resulting from an execution of the additional predicted vehicle maneuver into one of the plurality of risk-based categories.

22. The controller of claim 13, wherein the plurality of risk-based categories includes a low-risk category associated with an occurrence of a violation of a non-safety critical traffic rule associated with the predicted vehicle maneuver being executed, and wherein the one or more processors are configured to, when the consequence resulting from the execution of the predicted vehicle maneuver is categorized as the low-risk category, cause the vehicle to autonomously activate a vehicle component to correct for the occurrence of the violation of the non-safety critical traffic rule.

23. A non-transitory computer-readable medium of a vehicle having instructions stored thereon that, when executed by one or more processors of the vehicle, cause the vehicle to:

receive a first data stream comprising driver state data that includes images of a driver of the vehicle;

receive a second data stream comprising vehicle state data that includes images of an exterior of the vehicle, wherein the first data stream and the second data stream are received concurrently and within a sampling window of a predetermined time duration;

upon expiration of the predetermined time duration, (i) calculate, based upon an analysis of the images of the driver of the vehicle, a first probability from among a first set of probabilities of execution of each respective one of a first set of vehicle maneuvers, (ii) calculate, based upon an analysis of the images of the exterior of the vehicle, a second probability from among a second set of probabilities of execution of each respective one of a second set of vehicle maneuvers, and (iii) predict a vehicle maneuver based upon a weighted combination of the first probability and the second probability;

categorize a consequence resulting from an execution of the predicted vehicle maneuver into one of a plurality of risk-based categories, each one of the plurality of risk-based categories being based upon a severity of danger resulting from the execution of the predicted vehicle maneuver in a driving environment of the vehicle; and cause the vehicle to perform a corrective action that is based upon the one of the plurality of risk-based categories that the consequence resulting from the execution of the predicted vehicle maneuver is categorized.

24. The computer-readable medium of claim 23, wherein the plurality of risk-based categories includes a high-risk category associated resulting from the predicted vehicle maneuver matching one of a set of predetermined dangerous vehicle maneuvers when executed, a mid-risk category associated with an occurrence of atypical driver behavior when the predicted vehicle maneuver will be executed, and a low-risk category associated with an occurrence of a violation of a non-safety critical traffic rule when the predicted vehicle maneuver will be executed.

25. The computer-readable medium of claim 23, wherein the plurality of risk-based categories includes a high-risk category associated resulting from the predicted vehicle maneuver matching one of a set of predetermined dangerous vehicle maneuvers when executed, and wherein the instructions, when executed by the one or more processors of the vehicle, cause the vehicle to, when the consequence resulting from the execution of the predicted vehicle maneuver is categorized as the high-risk category, perform the corrective action corresponding to an intervening vehicle control-based operation to prevent the execution of the predicted vehicle maneuver.

26. The computer-readable medium of claim 23, wherein:

the plurality of risk-based categories includes a mid-risk category associated with an occurrence of atypical driver behavior when the predicted vehicle maneuver will be executed, and a low-risk category associated with an occurrence of a violation of a non-safety critical traffic rule when the predicted driving maneuver will be executed, and the instructions, when executed by the one or more processors of the vehicle, cause the vehicle to:

when the consequence resulting from the execution of the predicted vehicle maneuver is categorized as the mid-risk category, perform the corrective action corresponding to a generation of a notification to the driver about the atypical driver behavior; and when the consequence resulting from the execution of the predicted vehicle maneuver is categorized as the low-risk category, cause the vehicle to autonomously activate a vehicle component to correct for the occurrence of the violation of the non-safety critical traffic rule.

* * * * *